United States Patent
Emura

(10) Patent No.: US 9,652,988 B2
(45) Date of Patent: May 16, 2017

(54) DISPLAY CONTROL DEVICE, DISPLAY CONTROL METHOD, AND NON-TRANSITORY COMPUTER-READABLE STORAGE MEDIUM

(71) Applicant: Panasonic Intellectual Property Management Co., Ltd., Osaka (JP)

(72) Inventor: Koichi Emura, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 42 days.

(21) Appl. No.: 14/671,806

(22) Filed: Mar. 27, 2015

(65) Prior Publication Data
US 2015/0294570 A1    Oct. 15, 2015

(30) Foreign Application Priority Data

Apr. 9, 2014 (JP) ................................ 2014-080235
Dec. 10, 2014 (JP) ................................ 2014-250246

(51) Int. Cl.
G08G 1/16 (2006.01)
G06K 9/00 (2006.01)
G06T 11/00 (2006.01)

(52) U.S. Cl.
CPC ......... *G08G 1/166* (2013.01); *G06K 9/00805* (2013.01); *G06T 11/00* (2013.01);
(Continued)

(58) Field of Classification Search
CPC .... G06T 7/004; G08G 1/166; G06K 9/00805; G06K 9/00791; G06K 9/3241
See application file for complete search history.

(56) References Cited

U.S. PATENT DOCUMENTS

2013/0107050 A1*  5/2013  Maruoka ............. G08G 1/0962
                                                                348/148

FOREIGN PATENT DOCUMENTS

EP    2723069    4/2014
EP    2755184    7/2014
(Continued)

OTHER PUBLICATIONS

The Extended European Search Report from the European Patent Office (EPO) dated Nov. 17, 2015 for the related European Patent Application No. 15160429.5.
(Continued)

*Primary Examiner* — Hongmin Fan
(74) *Attorney, Agent, or Firm* — Greenblum & Bernstein, P.L.C.

(57) ABSTRACT

A display control device includes a unit for determining whether an object recognized by a recognition unit is present in a specific region adjacent to a locus, and a control unit controlling a display source, upon determination that the object is present in the specific region, to generate a first virtual image at first timing and a second virtual image at second timing later than the first timing. The first virtual image is displayed in a first region midway in a locus approaching direction toward a locus on a display medium, which corresponds to the locus, from a position thereon corresponding to an object position. The second imaginary region is displayed in a second region, located midway in the locus approaching direction closer to the locus than the first region, in size not smaller than that of the first virtual image displayed in the first region at the second timing.

10 Claims, 15 Drawing Sheets

(52) U.S. Cl.
CPC ............... *G06T 2207/10004* (2013.01); *G06T 2207/30252* (2013.01)

(56) References Cited

FOREIGN PATENT DOCUMENTS

| | | |
|---|---|---|
| EP | 2763403 | 8/2014 |
| JP | 2005-165555 | 6/2005 |
| WO | 2012/172923 | 12/2012 |
| WO | 2013/035445 | 3/2013 |
| WO | 2013/046409 | 4/2013 |

OTHER PUBLICATIONS

Hiroshi Fujimoto "The Vehicle-to-vehicle-communications for Driving Support System in the ASV-4 Project", vol. 95, No. 8, 2012, pp. 690-695.

* cited by examiner

FIG. 6

| TYPE OF ROAD SURFACE | DRIED STATE | WET STATE |
|---|---|---|
| PAVED ROAD SURFACE | 1.0 TO 0.5 | 0.9 TO 0.3 |
| SAND AND GRAVEL | 0.6 TO 0.4 | N/A |
| SNOW-COVERED ROAD SURFACE | N/A | 0.5 TO 0.2 |
| FROZEN ROAD SURFACE | N/A | 0.2 TO 0.1 |

DISPLAY CONTROL DEVICE, DISPLAY CONTROL METHOD, AND NON-TRANSITORY COMPUTER-READABLE STORAGE MEDIUM

BACKGROUND

1. Technical Field

The present disclosure relates to a display control device, a display control method, and a non-transitory computer-readable storage medium, which are used to control display of information for calling driver's attention.

2. Description of the Related Art

ADAS (Advanced Driver Assistance Systems) for calling driver's attention is becoming popular at present. As applications of ADAS, there are LDW (Lane Departure Warning), FCW (Forward Collision Warning), PCW (Pedestrian Collision Warning), and so on. In ADAS, traveling environments such as white lines, a leading vehicle, a vehicle approaching from behind, pedestrians in the traveling direction, etc. are detected by a vehicle-loaded camera or a vehicle-loaded radar, for example, and information obtained from the detected data is displayed. The information is displayed on, e.g., a meter display, an HUD (Head-Up Display), an HMD (Head-Mounted Display or Helmet-Mounted Display), or Smart Glasses.

Regarding assistance levels in the driver assistance system, three levels are defined, i.e., warning, attention calling, and information presenting (see, e.g., Hiroshi Fujimoto, "2-1 The Vehicle-to-vehicle-communications for Driving Support System in the ASV-4 Project (2. Application Examples, <Short Special Topic> Vehicle and Information Communication Technology)", Journal of IEIEC, The Institute of Electronics, Information and Communication Engineers (IEIEC), Aug. 1, 2012, Vol. 95, No. 8, p. 690-695). At the warning level, it is expected to enable the driver to make a response with quick behavior by predicting a possibility of an accident from detected information, and prompting a driver to immediately take an appropriate action or operation, thus. At the attention calling level, it is expected to enable the driver to make a response with rather quick behavior by calling driver's attention at particular timing, at a particular place, or when a particular operation or a particular situation is generated by a driver. At the information presenting level, it is expected to enable the driver to make a response with an action in an ordinary driving mode by presenting objective information for safety driving to a driver.

In a typical ADAS application such as FCW or PCW, another vehicle or a pedestrian which or who may directly collide against a vehicle of the relevant driver is detected to call driver's attention or to issue a warning.

On the other hand, from the viewpoint of realizing safety driving, the necessity of training an ability of predicting a risk or an ability of avoiding an accident is discussed. The training includes, for example, risk prediction training, accident avoidance training, and risk anticipation training. The risk prediction is to estimate a motion of a pedestrian, e.g., such a motion of a pedestrian as jumping into the front of a vehicle from a dead corner at an intersection with poor visibility or from between adjacent vehicles in a traffic jam in an opposing lane. The accident avoidance is to reduce a vehicle speed and to travel at a crawl. Here, the system is unable to detect a pedestrian who is not actually present. Therefore, a possibility that a pedestrian may jump into the front of a vehicle is estimated by detecting static traveling environments, such as buildings, etc., which make visibility in the intersection poor, at corners of an intersection, or dynamic obstacles, such as a string of vehicles in a traffic jam across which a pedestrian may go. On that occasion, because there is a possibility that the estimated pedestrian is not present in fact, driver assistance at the attention calling level or the information presenting level described above is appropriate.

Hitherto, a dangerous place display system is known which allows a driver to previously recognize a region or an object (e.g., another vehicle or a pedestrian) in or on which there is a possibility of an accident with respect to a vehicle of the driver (see, e.g., Japanese Patent No. 4228894).

SUMMARY

However, the technique disclosed in Japanese Patent No. 4228894 does not notify, to the driver, a degree of urgency in determining whether the driver is to take avoidance behavior with respect to the region or the object in or for which there is a possibility of an accident (hereinafter referred to simply as the "urgency"), or uncertainty in motion of the object on which there is a possibility of an accident (hereinafter referred to simply as the "uncertainty").

One non-limiting and exemplary embodiment provides a display control device, a display control method, and a non-transitory computer-readable storage medium, which can notify the urgency or the uncertainty to a driver.

In one general aspect, the techniques disclosed here feature a display control device constituting a display system including a recognition unit that obtains a foreground image representing a forward visual field of a passenger on a movable body, and that recognizes an object contained in the foreground image, an estimation unit that estimates a locus along which the movable body travels, and a display source that generates a specific image and displays or projects the specific image on a display medium. The display control device includes a determination unit that determines whether the object recognized by the recognition unit is present in a specific region adjacent to the locus, and a control unit that controls the display source, when the determination unit determines that the object is present in the specific region, to generate a first virtual image and to display the first virtual image in a first region at least at first timing, and to generate a second virtual image at second timing later than the first timing. The first region is displayed in a first region that is located midway in a direction toward a locus on a display medium, which corresponds to the aforesaid locus, from a position on the display medium, which corresponds to a position where the object is present. The second imaginary region is displayed in a second region in an enlarged size equal to or larger than a size of the first virtual image displayed in the first region at the second timing, the second region being located midway in the direction toward the locus on the display medium, which corresponds to the aforesaid locus, from the position on the display medium, which corresponds to a position where the object is present, and being located closer to the locus on the display medium than the first region.

According to the present disclosure, the urgency or the uncertainty can be notified to a driver.

It should be noted that general or specific embodiments may be implemented as a system, a method, an integrated circuit, a computer program, a storage medium, or any selective combination thereof.

Additional benefits and advantages of the disclosed embodiments will become apparent from the specification

BRIEF DESCRIPTION OF THE DRAWINGS

FIG. 6 represents friction coefficients of various types of road surfaces in the second embodiment of the present disclosure;

DETAILED DESCRIPTION

First Embodiment

A first embodiment of the present disclosure will be described below with reference to the drawings.

Figure 1:
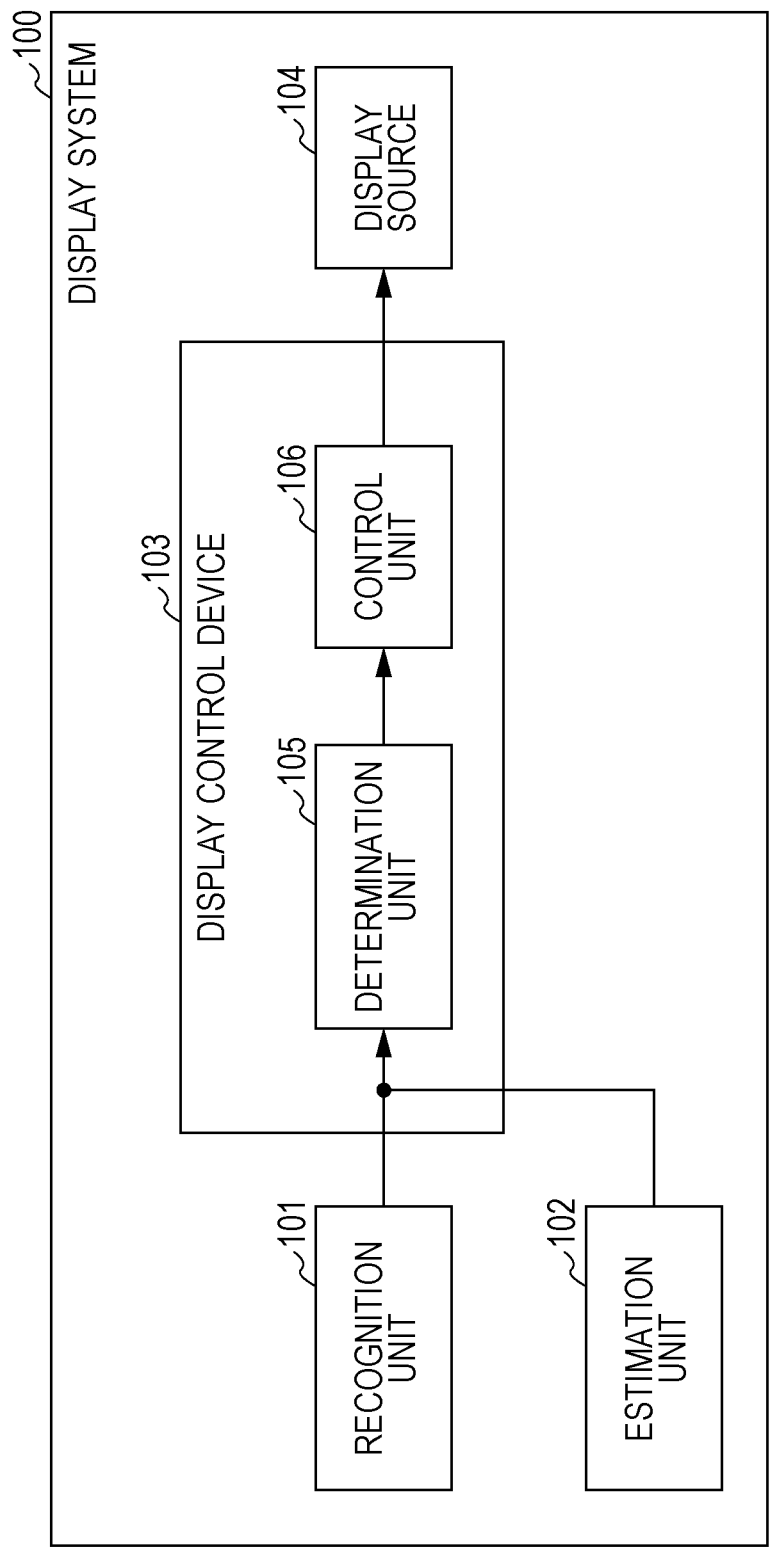
FIG. 1 is a block diagram illustrating a configuration example of a display system according to a first embodiment of the present disclosure.

To begin with, a configuration example of a display system 100 according to the first embodiment is described with reference to FIG. 1. FIG. 1 is a block diagram illustrating a configuration example of the display system 100 according to the first embodiment.

The display system 100 is used, for example, in a mobile body such as a vehicle. In other words, the display system 100 may be an apparatus mounted in a vehicle or an apparatus brought into a vehicle. While, in the first embodiment, the display system 100 is described as being applied to a vehicle, the movable body is not limited to the vehicle, and it may be a ship or an airplane, for example. Furthermore, while the first embodiment is described in connection with an example in which a user is a passenger of the vehicle, particularly a driver of the vehicle, the present disclosure is not limited to that case. Moreover, the display system 100 may be used in a wearable computer (e.g., a later-described HMD) that can be used in a state put on a user's body.

In FIG. 1, the display system 100 includes a recognition unit 101, an estimation unit 102, a display control device 103, and a display source 104.

The recognition unit 101 obtains a foreground image representing a forward visual field of the vehicle driver, extracts a feature parameter contained in the foreground image, and recognizes a specific object based on the extracted feature parameter. The recognition unit 101 is, for example, a camera that is mounted in or for the vehicle, and that senses the forward visual field of the driver. Examples of the object include a white line on a road, a traffic sign, a mark on a road surface, a curb, a guardrail, a traffic light, a power pole, a vehicle, a person, and a building. It is assumed that the objects recognized by the recognition unit 101 in the first embodiment are objects (e.g., a building and a vehicle), which obstruct the visual field of the driver. Because techniques related to recognition of the object are known in the art, detailed description of those techniques is omitted.

The estimation unit 102 estimates a locus along which the vehicle travels (hereinafter referred to as a "vehicle locus"). Because techniques related to estimation of the vehicle locus are known in the art, detailed description of those techniques is omitted.

The display control device 103 controls image data, which is projected from the display source 104, in accordance with information of the object recognized by the recognition unit 101 and information of the vehicle locus estimated by the estimation unit 102. The display control device 103 includes a determination unit 105 and a control unit 106. Details of the determination unit 105 and the control unit 106 are described later.

The display source 104 generates image data under control of the display control device 103 and projects the generated image data onto a not-illustrated display (one example of a display medium). The display source 104 has the projector function and directly projects the image data onto the display. It is to be noted that, instead of utilizing the projector function, the display source 104 may control the display to present the image data, or may use a hologram. In the case using a hologram, the hologram may be presented by a method of employing a light guide plate that guides a group of parallel light fluxes with total internal reflection, the fluxes satisfying the total internal reflection condition of the light guide plate, and outputting a part of the parallel light fluxes, which are guided through the light guide plate with the total internal reflection, such that the driver can view a virtual image. In the method using the light guide plate, the image data is not directly projected unlike a projector. For convenience of explanation, however, the term "projection" is employed in the following as in the case using the projector.

The display may be, e.g., an LCD (Liquid Crystal Display), an HUD (Head-Up Display), an HMD (Head-Mounted Display or Helmet-Mounted Display), Smart Glasses, a navigation display, a meter display, or another dedicated display. The HUD may be, e.g., a windshield of the vehicle, or a glass surface or a plastic surface that is separately provided. The windshield may be, e.g., a front windshield, a side windshield, or a back windshield of the vehicle.

The display system 100 may include the above-described display.

The above-described image data may be generated by the display control device 103 or another not-illustrated component instead of the display source 104.

The image data generated by the display system 100 contains presentation information (e.g., a virtual image described later) that is presented to the driver of the vehicle. In other words, the presentation information is projected as a part of the image data onto the display. The projected presentation information is viewed as a virtual image by the driver. Because techniques related to the principle of allowing the driver to view, as a virtual image, the presentation information projected onto the display are known in the art, description of those techniques is omitted.

The presentation information may be projected onto the display in a state superimposed on the visual field of the driver instead of being projected as a part of the image data onto the display. In such a case, the display control device 103 may control just the presentation information, and the display source 104 may project just the presentation information onto the display. The following description is made about an example in which the presentation information is projected onto the display in a state superimposed on the visual field of the driver.

The configuration of the display control device 103 in the first embodiment will be described below. In FIG. 1, the display control device 103 includes the determination unit 105 and the control unit 106.

The determination unit 105 determines whether the object recognized by the recognition unit 101 is present in a specific region adjacent to the vehicle locus estimated by the estimation unit 102. More specifically, the determination unit 105 calculates a distance between the vehicle locus and the object from both coordinate information of the vehicle locus and coordinate information of the object, and determines that the object is present in a specific region if the calculated distance is within a specific value.

If it is determined by the determination unit 105 that the object is present in the specific region, the control unit 106 determines a first display region in a direction (hereinafter referred to as a "locus approaching direction") toward the vehicle locus from a position where the object is present (e.g., a corner of the object). The first display region is a region that is defined on the display, and that is located closer to the object and farther away from the vehicle locus than later-described second and third display regions in the locus approaching direction. Stated in another way, the first display region is a region located midway in the locus approaching direction toward a vehicle locus on the display, which corresponds to the estimated vehicle locus, from a position on the display, which corresponds to the position where the object is present. While the expression "display region" is used here, the expression "display position" may be used instead (this point is similarly applied to the later-described second and third display regions). It is optional whether the position where the object is present and the vehicle locus are displayed or not on the display.

The control unit 106 controls the display source 104 at first timing to generate a first virtual image in the first display region and to project the first virtual image onto the display. This control is referred to as "first control" hereinafter.

The control unit 106 determines after the first control whether the number of times at which the virtual image has been generated (hereinafter referred to as the "number of times of image generation") reaches a specific number. The number of times of image generation can also be said as being the number of times at which the control unit 106 has controlled the display source 104 to generate and project the virtual image.

If the control unit 106 determines after the first control that the number of times of image generation does not yet reach the specific number, the control unit 106 updates the first display region and determines the second display region in the locus approaching direction. The second display region is a region that is defined on the display, and that is located farther away from the object than the updated first display region and farther away from the vehicle locus than later-described third display region in the locus approaching direction. Stated in another way, the second display region is a region that is located midway in the locus approaching direction at a position closer to the vehicle locus on the display than the first display region.

At second timing later than the first timing, the control unit 106 controls the display source 104 to generate a first enlarged virtual image in the updated first display region, to generate a second virtual image in the second display region, and to project those virtual images onto the display. This control is referred to as "second control" hereinafter. The first enlarged virtual image is an image obtained by enlarging the first virtual image (namely, the first virtual image after being updated). The second virtual image is an image obtained by enlarging the first enlarged virtual image at a magnification of one or more.

The control unit 106 determines after the second control whether the number of times of image generation reaches the specific number. Then, until the number of times of image generation reaches the specific number, the control unit 106 repeats the above-described processing to update and determine the display regions and the above-described processing to control the display source 104.

Figure 2:
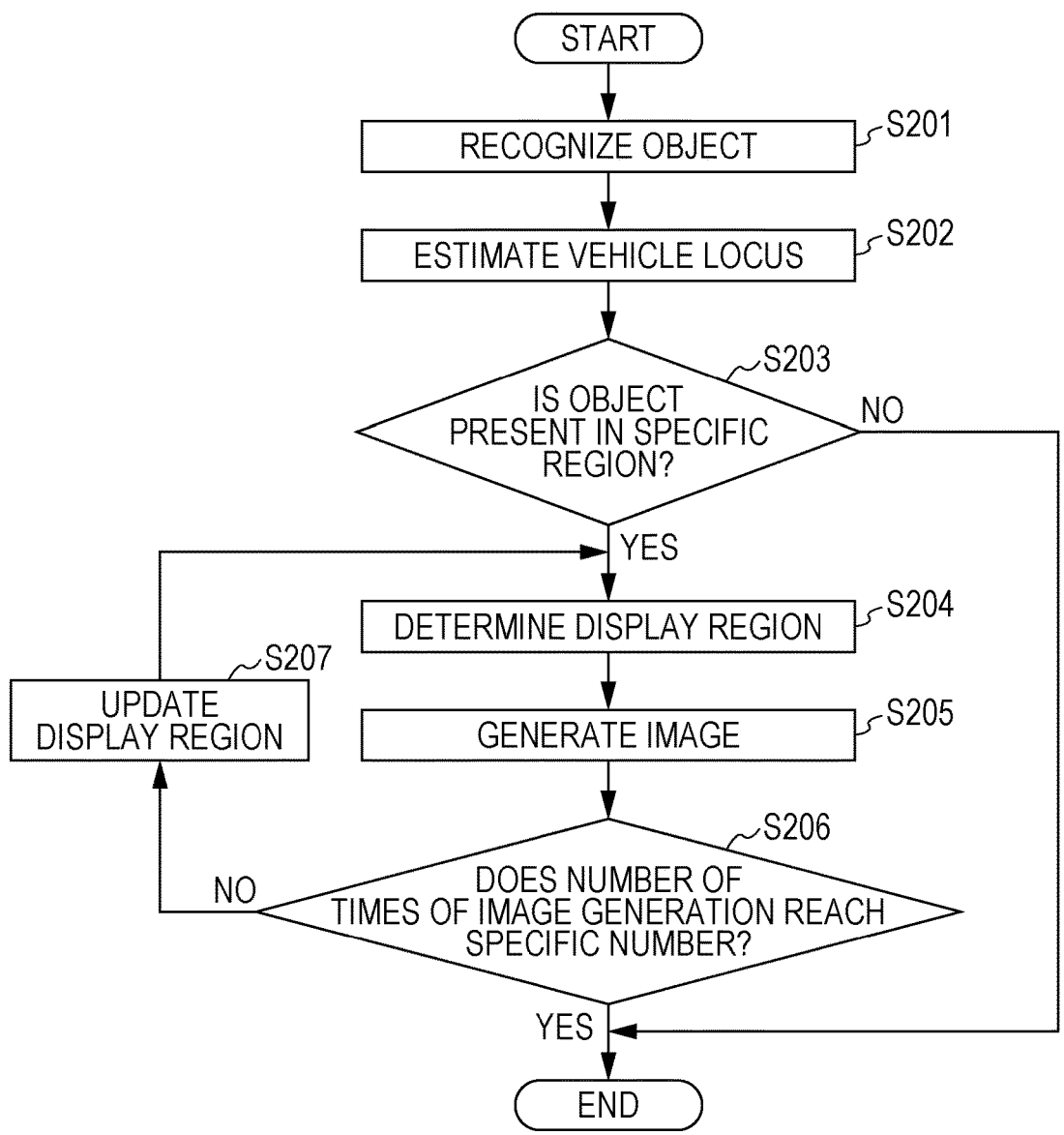
FIG. 2 is a flowchart illustrating an operation example of the display system according to the first embodiment of the present disclosure.
Figure 3A:
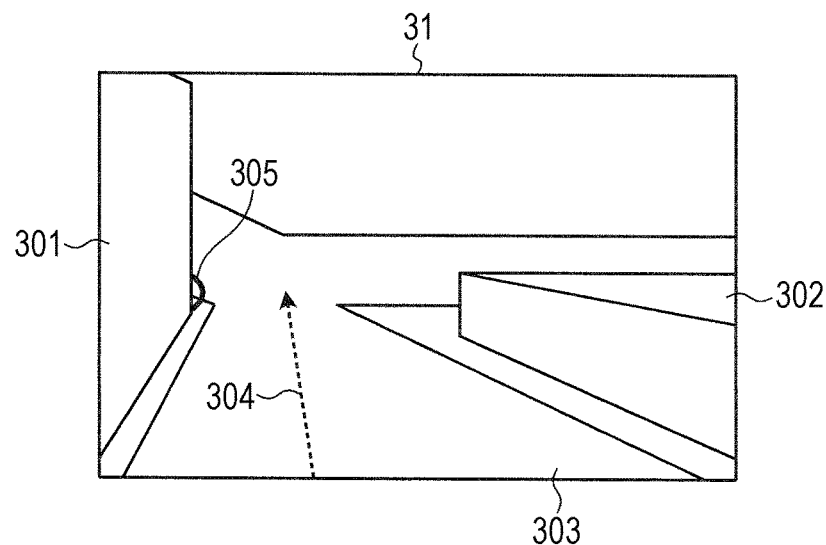
FIG. 3A illustrates one example of a visual field of a driver and one example of an image presented to the driver at one point in a time sequence according to the first embodiment of the present disclosure.
Figure 3B:
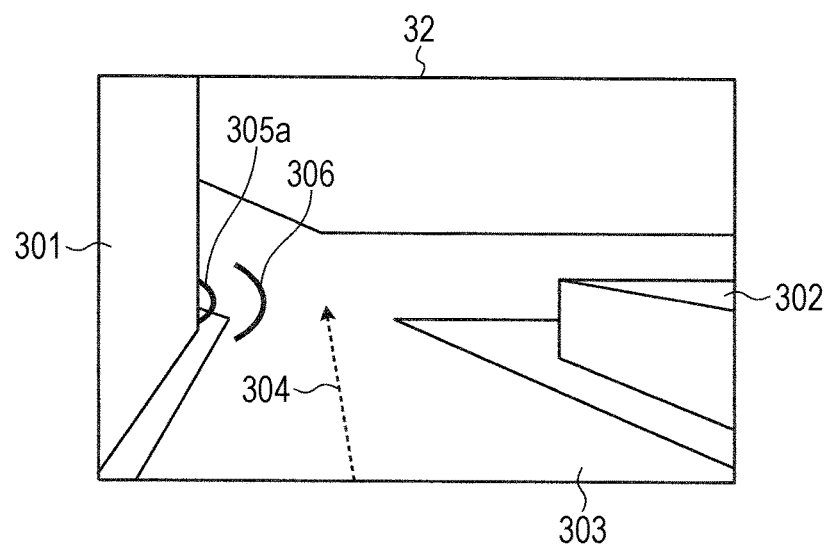
FIG. 3B illustrates one example of the visual field of the driver and one example of the image presented to at another point in a time sequence the driver according to the first embodiment of the present disclosure.
Figure 3C:
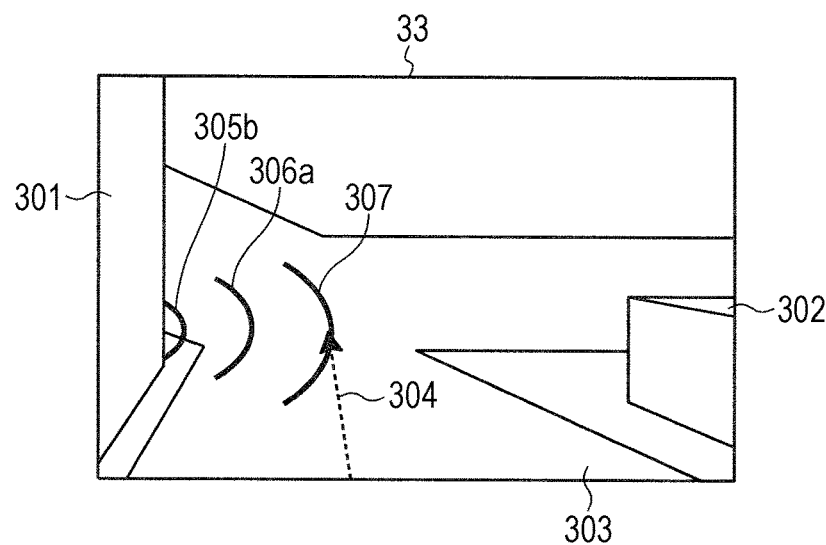
FIG. 3C illustrates one example of the visual field of the driver and one example of the image presented to the driver at still another point in a time sequence according to the first embodiment of the present disclosure.

An operation example of the display system 100 according to the first embodiment will be described below with reference to FIGS. 2 and 3A to 3C. FIG. 2 is a flowchart illustrating the operation example of the display system 100 according to the first embodiment, and FIGS. 3A to 3C illustrate, in a time sequence, examples of a visual field of a driver and examples of a virtual image presented to the driver. The following description is made, by way of example, in connection with the case where the vehicle is traveling forward and the visual field of the driver is changed with the lapse of time.

First, a processing flow is described with reference to FIGS. 2 and 3A. FIG. 3A illustrates an example a visual field 31 of the driver at a time t.

In step S201, the recognition unit 101 obtains a foreground image representing the visual field 31, and recognizes a building 301 and a hedge 302, which are contained in the foreground image. The building 301 and the hedge 302 are examples of the objects obstructing the visual field of the driver.

In step S202, the estimation unit 102 estimates a vehicle locus 304 on a road 303 where the vehicle is traveling. The vehicle locus 304 represents the traveling direction of the vehicle. While FIG. 3A illustrates the vehicle locus 304 for the sake of explanation, it is optional whether an image of the vehicle locus 304 is displayed or not on the display.

In step S203, the determination unit 105 of the display control device 103 determines whether the building 301 and the hedge 302 are present in a specific region adjacent to the vehicle locus 304. If the determination unit 105 determines that the building 301 and the hedge 302 are both not present in the specific region (step S203: NO), the flow is ended. Assume here, for example, that the determination unit 105 determines that just the building 301 is present in the specific region (step S203: YES).

In step S204, the control unit 106 of the display control device 103 determines the first display region (not illustrated) midway in the locus approaching direction toward the vehicle locus 304 from a corner of the building 301 (preferably a corner to which the vehicle traveling along the vehicle locus 304 comes closer later in time). The first display region is located closest to the building 301 and farthest away from the vehicle locus 304 in the locus approaching direction in comparison with the second and third display regions.

In step S205, the control unit 106 controls the display source 104 at first timing to generate a first virtual image 305, which is in the form of a part of a water ring (or an arched shape), in the first display region, and to project the first virtual image 305 onto the display (this corresponds to the first control). The first timing is the same as or later than the time t, and it is before a time t'.

With the first control, at the first timing, the display source 104 generates the first virtual image 305 in the first display region and projects the first virtual image 305 onto the display. As a result, the first virtual image 305 is displayed in a state superimposed on the visual field 31, as illustrated in FIG. 3A. A size of the first virtual image 305 indicates a range within which the object may move toward the vehicle locus 304 (this point is similarly applied to the other virtual images described later).

In step S206, the control unit 106 determines whether the number of times at which the virtual image has been generated reaches a specific number (e.g., three). Here, because the processing is in a stage after the first control, the number of times of image generation is one. Accordingly, the control unit 106 determines that the number of times of image generation does not yet reach three (step S206: NO). Then, the flow proceeds to step S207. The specific number is not limited to three.

The processing flow is further described with reference to FIGS. 2 and 3B. FIG. 3B illustrates an example of a visual field 32 of the driver at a time t' (t'>t). The visual field 32 is provided in a scale enlarged from that of the visual field 31 with the lapse of time and with the traveling of the vehicle.

In step S207, the control unit 106 updates the first display region in the locus approaching direction toward the vehicle locus 304 from the building 301 in accordance with the change (enlargement) from the visual field 31 to the visual field 32. Then, the flow returns to step S204.

In step S204, the control unit 106 determines the second display region (not illustrated) midway in the locus approaching direction toward the vehicle locus 304 from the building 301. The second display region is a region located farther away from the building 301 than the updated first display region and farther away from the vehicle locus 304 than the third display region in the locus approaching direction.

In step S205, the control unit 106 controls the display source 104 at second timing to generate a first enlarged virtual image 305a in the updated first display region, to generate a second virtual image 306 in the second display region, and to project both the virtual images onto the display (this corresponds to the second control). The first enlarged virtual image 305a is an image obtained by enlarging the first virtual image 305. The second virtual image 306 is an image obtained by enlarging the first enlarged virtual image 305a at a magnification of one or more. The second timing is the same as or later than the time t', and it is before a time t".

With the second control, at the second timing, the display source 104 generates the first enlarged virtual image 305a in the updated first display region, generates the second virtual image 306 in the second display region, and projects those virtual images onto the display. As a result, the first enlarged virtual image 305a and the second virtual image 306 are displayed in a state superimposed on the visual field 32, as illustrated in FIG. 3B.

In step S206, the control unit 106 determines whether the number of times at which the virtual image has been generated reaches three. Here, because the processing is in a stage after the second control, the number of times of image generation is two. Accordingly, the control unit 106 determines that the number of times of image generation does not yet reach three (step S206: NO). Then, the flow proceeds to step S207.

The processing flow is further described with reference to FIGS. 2 and 3C. FIG. 3C illustrates an example of a visual field 33 of the driver at a time t" (t">t'). The visual field 33 is provided in a scale enlarged from that of the visual field 32 with the lapse of time and with the traveling of the vehicle.

In step S207, the control unit 106 updates the updated first display region and the second display region in the locus approaching direction toward the vehicle locus 304 from the building 301 in accordance with the change (enlargement) from the visual field 32 to the visual field 33. Then, the flow returns to step S204.

In step S204, the control unit 106 determines the third display region (not illustrated) midway in the locus approaching direction toward the vehicle locus 304 from the building 301. The third display region is located farther away from the building 301 and closer to the vehicle locus 304 than the updated second display region in the locus approaching direction.

In step S205, the control unit 106 controls the display source 104 at third timing to generate a first enlarged virtual image 305*b* in the re-updated first display region, to generate a second enlarged virtual image 306*a* in the updated second display region, to generate a third virtual image 307 in the third display region, and to project those virtual images onto the display (this corresponds to the third control). The first enlarged virtual image 305*b* is an image obtained by enlarging the first enlarged virtual image 305*a*. The second enlarged virtual image 306*a* is an image obtained by enlarging the first enlarged virtual image 305*b* at a magnification of one or more. The third virtual image 307 is an image obtained by enlarging the second enlarged virtual image 306*a* at a magnification of one or more. The third timing is the same as or later than the time t".

With the third control, at the third timing, the display source 104 generates the first enlarged virtual image 305*b* in the re-updated first display region, generates the second enlarged virtual image 306*a* in the updated second display region, generates the third virtual image 307 in the third display region, and projects those virtual images onto the display. As a result, the first enlarged virtual image 305*b*, the second enlarged virtual image 306*a*, and the third virtual image 307 are displayed in a state superimposed on the visual field 33, as illustrated in FIG. 3C.

In step S206, the control unit 106 determines whether the number of times at which the virtual image has been generated reaches three. Here, because the processing is in a stage after the third control, the number of times of image generation is three. Accordingly, the control unit 106 determines that the number of times of image generation has reached three (step S206: YES). The flow is thereby ended.

As described above, the first embodiment is featured in displaying a plurality of virtual images at intervals of a specific time such that the virtual images come closer to the vehicle locus from the object obstructing the visual field. With that feature, the driver can confirm the region or the object in or for which there is a possibility of an accident, and the driver can recognize whether an action to avoid the accident is to be taken at once (i.e., the urgency).

Furthermore, the first embodiment is featured in displaying the plural virtual images at magnifications gradually increasing at positions closer to the vehicle locus while the size of each virtual image represents the range within which the object may move toward the vehicle. With that feature, the driver can confirm the range where an accident may occur with respect to an object, which is uncertain in motion, (i.e., the uncertainty) at intervals of a specific time.

The above-described flow can be further applied to the case where the visual field of the driver is not changed with the lapse of time (e.g., the case where the vehicle is stopped). In that case, because the visual field is not changed with lapse of time, the processing to update the display position and to enlarge the virtual image having been generated is not executed.

While the first embodiment of the present disclosure has been described above, the present disclosure is not limited to the first embodiment, and it can be modified variously. Modifications of the first embodiment will be described below.

(First Modification)

The shape of the virtual image is not limited to a part of a water ring, and it may have another suitable form. Moreover, the number of the virtual images is not limited to three. The number of the virtual images may be two or a number of four or more.

(Second Modification)

The control unit 106 may execute control in a way of determining the display regions such that the distance between the adjacent display regions is shortened as the vehicle approaches the object obstructing the visual field, and generating the virtual images in the determined display regions, respectively. Such a modification is described, by way of example, with reference to FIG. 3B. The control unit 106 calculates a crossing point between the vehicle locus 304 and a line extending from a coordinate position of the corner of the building 301 (i.e., one example of the recognition result of the recognition unit 101) to the vehicle locus 304. Then, the control unit 106 determines the display regions such that the distance between the first display region and the second display region after being updated is shortened as the distance between the calculated crossing point and the vehicle is shorter. Furthermore, the control unit 106 controls the display source 104 to generate the first enlarged virtual image 305*a* and the second virtual image 306 in the determined display regions, respectively. As a result, the first enlarged virtual image 305*a* and the second virtual image 306 are displayed in closer relation. Thus, according to this modification, since the spacing between the virtual images displayed adjacent to each other is narrowed as the vehicle approaches the object, it is possible to call driver's attention and to notify the urgency and the uncertainty to the driver more effectively. In addition, the driver can be notified of the situation that the vehicle is approaching the object.

(Third Modification)

The control unit 106 may execute control in a way of determining the display regions such that the distance between the adjacent display regions is shortened as a traveling speed of the vehicle is higher, and generating the virtual images in the determined display regions, respectively. Alternatively, the control unit 106 may execute control in a way of determining the display regions such that the distance between the adjacent display regions is shortened as change in the traveling speed of the vehicle is quicker, and generating the virtual images in the determined display regions, respectively. Since processing performed in this modification is similar to that in the above-described second modification, description of the processing in this modification is omitted. Thus, according to this modification, since the spacing between the virtual images displayed adjacent to each other is narrowed as the traveling speed of the vehicle is higher or as change in the traveling speed of the vehicle is quicker, it is possible to call driver's attention and to notify the urgency and the uncertainty to the driver more effectively. In addition, the driver can be notified of the fact that the traveling speed of the vehicle is fast.

(Fourth Modification)

The control unit 106 may control the display source 104 in a way of shortening a time taken to display the adjacent virtual images as the vehicle approaches the object obstructing the visual field. Such a modification is described, by way of example, with reference to FIG. 3B. The control unit 106 calculates the crossing point between the vehicle locus 304 and the line extending from the coordinate position of the corner of the building 301 (i.e., one example of the recognition result of the recognition unit 101) to the vehicle locus 304. Then, the control unit 106 controls the display source 104 such that a time from the display of the first enlarged virtual image 305*a* to the display of the second virtual image 306 is shortened as the distance between the calculated crossing point and the vehicle is shorter. As a result, the second virtual image 306 is displayed immediately after displaying the first enlarged virtual image 305*a*. Thus, according to this modification, since the time taken to display the adjacent virtual images is shortened as the vehicle approaches the object, it is possible to call driver's attention and to notify the urgency and the uncertainty to the driver more effectively. In addition, the driver can be notified of the situation that the vehicle is approaching the object.
(Fifth Modification)

The control unit 106 may control the display source 104 in a way of shortening the time taken to display the adjacent virtual images as the traveling speed of the vehicle is higher. Alternatively, the control unit 106 may control the display source 104 in a way of shortening the time taken to display the adjacent virtual images as change in the traveling speed of the vehicle is quicker. Since processing performed in this modification is similar to that in the above-described fourth modification, description of the processing in this modification is omitted. Thus, according to this modification, since the time taken to display the adjacent virtual images is shortened as the traveling speed of the vehicle is higher or as change in the traveling speed of the vehicle is quicker, it is possible to call driver's attention and to notify the urgency and the uncertainty to the driver more effectively. In addition, the driver can be notified of the fact that the traveling speed of the vehicle is fast.
(Sixth Modification)

The foregoing flow has been described in connection with the example in which it is determined in step S203 that, of the building 301 and the hedge 302, just the building 301 is present in the specific region adjacent to the vehicle locus 304. An example in which it is determined that a plurality of objects is present in the specific region will be described below with reference to FIGS. 2 and 4.

Figure 4:
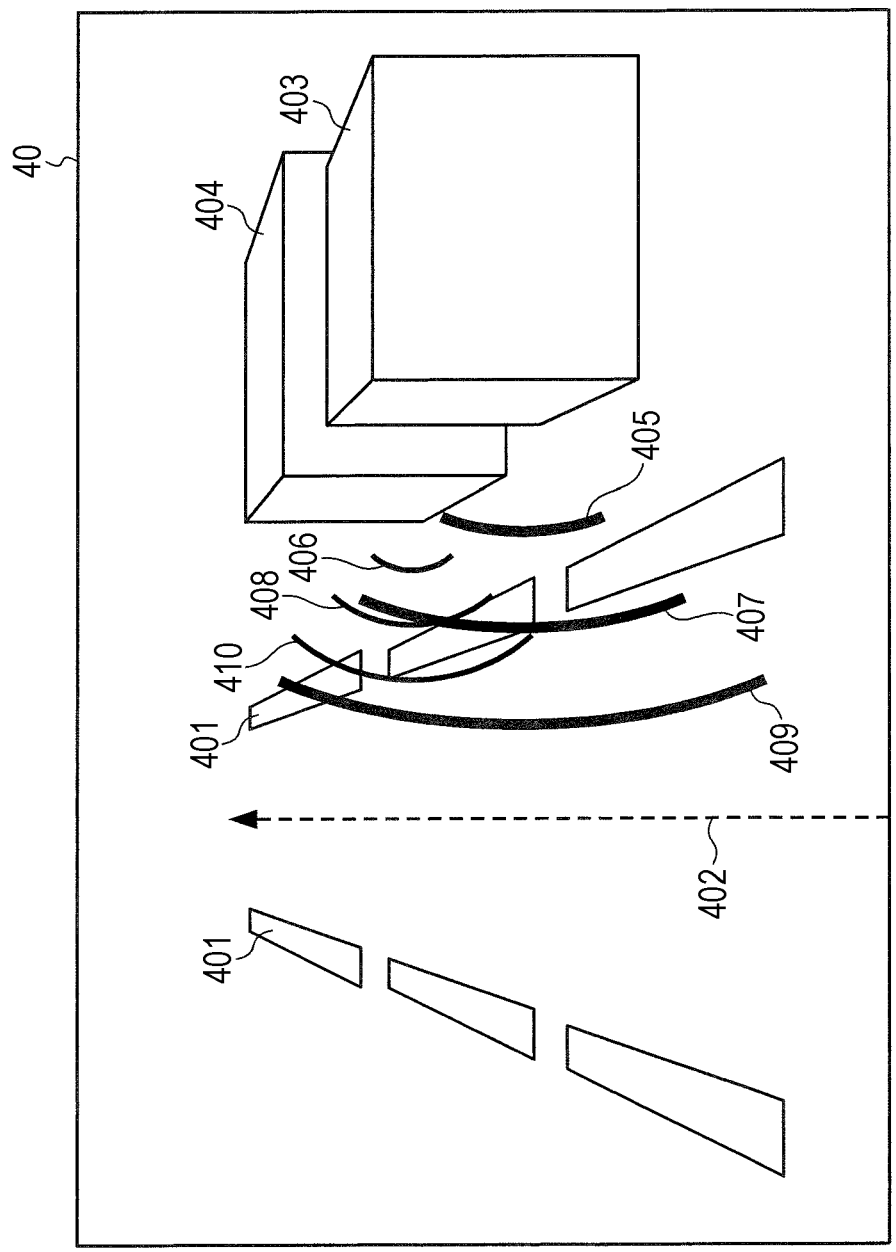
FIG. 4 illustrates one example of the visual field of the driver and examples of images presented to the driver according to a modification of the first embodiment of the present disclosure.

FIG. 4 illustrates one example of the visual field of the driver and examples of virtual images presented to the driver. While, for the sake of easier understanding, FIG. 4 illustrates the case where virtual images 405 to 410 to be displayed are all displayed on a visual field 40 in a superimposed state, the following description is made about a process of displaying the those virtual images in a time sequence. Furthermore, as in the above-described flow, the following description is made, by way of example, in connection with the case where the vehicle is traveling forward and the visual field 40 of the driver is changed with the lapse of time.

First, a processing flow at a time t is described.

In step S201, the recognition unit 101 obtains a foreground image representing the visual field 40, and recognizes vehicles 403 and 404, which are contained in the foreground image. The vehicles 403 and 404 are examples of the objects obstructing the visual field of the driver. The vehicles 403 and 404 are stopped, for example, in a lane or along a road shoulder positioned on the right side of a lane where the vehicle of the relevant driver is present (i.e., a lane sandwiched between lane markers 401). The vehicles 403 and 404 may be vehicles traveling ahead or vehicles oncoming in the opposite direction.

In step S202, the estimation unit 102 estimates a vehicle locus 402 on the lane where the vehicle is present. While FIG. 4 illustrates the vehicle locus 402 for the sake of explanation, an image of the vehicle locus 402 is not displayed in fact.

In step S203, the determination unit 105 determines whether the vehicles 403 and 404 are present in a specific region adjacent to the vehicle locus 402. Assume here, for example, that the determination unit 105 determines that the vehicles 403 and 404 are both present in the specific region (step S203: YES).

In step S204, the control unit 106 determines a first display region A (not illustrated) midway in a first locus approaching direction toward the vehicle locus 402 from the vehicle 403. The first display region A is located closer to the vehicle 403 and farther away from the vehicle locus 402 than a later-described second display region A in the first locus approaching direction.

Furthermore, in step S204, the control unit 106 determines a first display region B (not illustrated) midway in a second locus approaching direction toward the vehicle locus 402 from the vehicle 404. The first display region B is located closer to the vehicle 404 and farther away from the vehicle locus 402 than a later-described second display region B in the second locus approaching direction.

In step S205, the control unit 106 controls the display source 104 at first timing to generate a first virtual image 405, which is in the form of a part of a water ring, in the first display region A, and to project the first virtual image 405 onto the display (this corresponds to first control (a)). The first timing is the same as or later than the time t, and it is before a time t'.

With the first control (a), at the first timing, the display source 104 generates the first virtual image 405 in the first display region A and projects the first virtual image 405 onto the display. As a result, the first virtual image 405 is displayed in a state superimposed on the visual field 40, as illustrated in FIG. 4.

Furthermore, in step S205, the control unit 106 controls the display source 104 at the first timing to generate a first virtual image 406, which is in the form of a part of a water ring, in the first display region B, and to project the first virtual image 406 onto the display (this corresponds to first control (b)).

In the first control (b), the control unit 106 executes control such that the first virtual image 406 has a smaller size than the first virtual image 405, because the vehicle 404 is present at a position farther away from the vehicle of the relevant driver than the vehicle 403.

With the first control (b), at the first timing, the display source 104 generates the first virtual image 406 in the first display region B and projects the first virtual image 406 onto the display. As a result, the first virtual image 406 is displayed in a state superimposed on the visual field 40, as illustrated in FIG. 4.

In step S206, the control unit 106 determines whether the number of times at which the virtual image has been generated reaches a specific number (e.g., three). It is here assumed that the first control (a) and the first control (b) are collectively regarded as one control, and that the generations of the first virtual images 405 and 406 are also collectively regarded as one image generation. Accordingly, the control unit 106 determines that the number of times of image generation is one and does not yet reach the specific number, i.e., three (step S206: NO). Then, the flow proceeds to step S207.

The processing flow at the time t' (t'>t) is described below.

In step S207, the control unit 106 updates the first display regions A and B in the respective locus approaching directions toward the vehicle locus 402 from the vehicles 403 and 404 in accordance with the change (enlargement) of the visual field. Then, the flow returns to step S204.

Thereafter, as in the case described above in the first embodiment, the control unit 106 executes the processing of steps S204 to S206 (detailed description of each step is omitted here). As a result, second virtual images 407 and 408 are displayed at the second timing in a state superimposed on the visual field 40, and third virtual images 409 and 410 are displayed at the third timing in a state superimposed on the visual field 40, as illustrated in FIG. 4. The second virtual image 408 and the third virtual image 410 are displayed in smaller sizes than the second virtual image 407 and the third virtual image 409, respectively.

According to this modification, as described above, when a plurality of objects is present in the specific region adjacent to the vehicle locus, the urgency and the uncertainty depending on the distance up to each of the objects can be notified to the driver by displaying virtual images corresponding to the objects in sizes different depending on the distances between the relevant vehicle and the objects.

(Seventh Modification)

The functions of various components of the above-described display system 100 and display control device 103 may be implemented with computer programs.

Second Embodiment

A second embodiment of the present disclosure will be described below with reference to the drawings.

Figure 5:
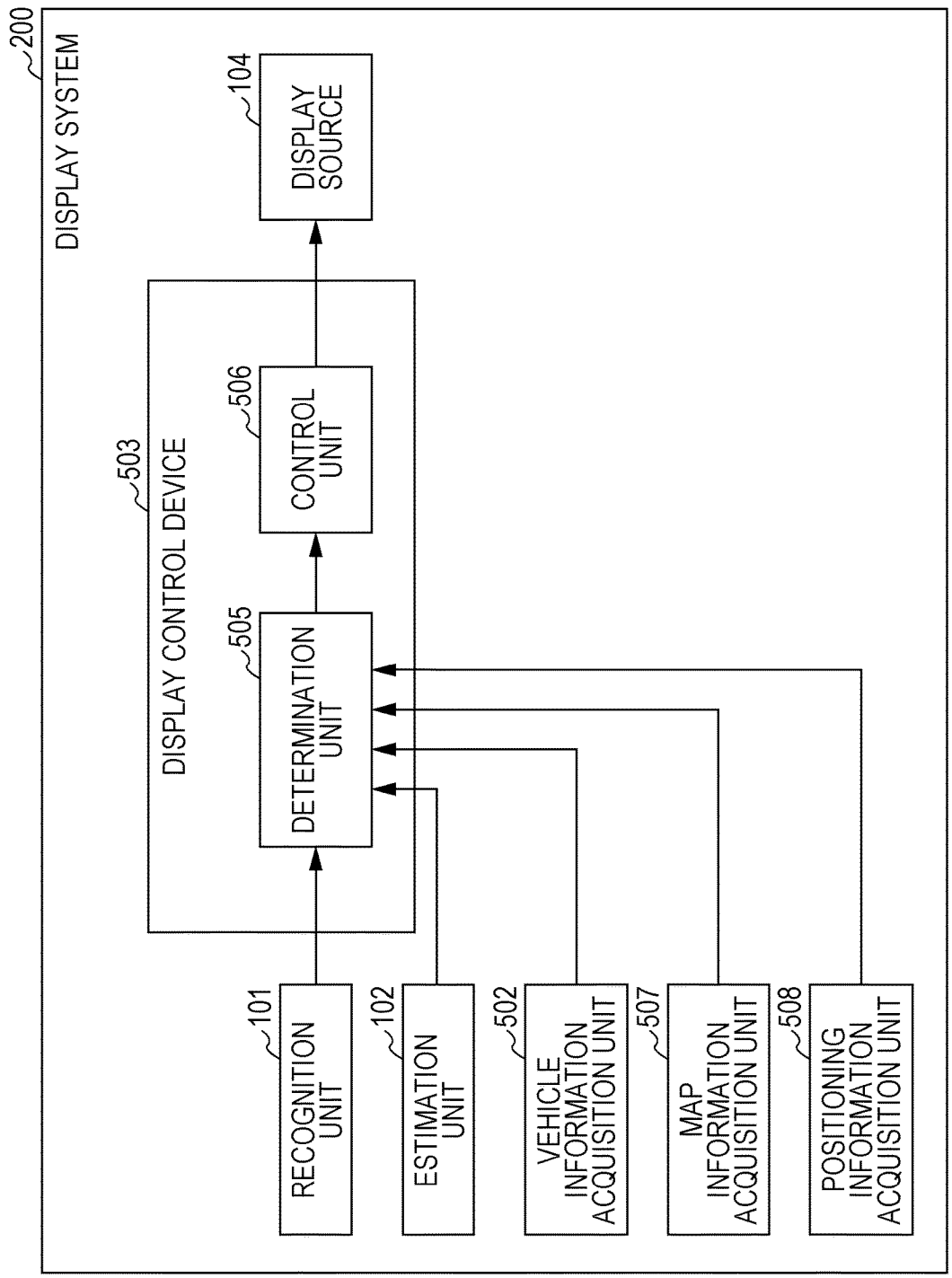
FIG. 5 is a block diagram illustrating a configuration example of a display system according to a second embodiment of the present disclosure.

A configuration example of a display system 200 according to the second embodiment is described with reference to FIG. 5. FIG. 5 is a block diagram illustrating the configuration example of the display system 200 according to the second embodiment. The same components in FIG. 5 as those in the first embodiment are denoted by the same reference signs, and descriptions of those components are omitted.

The display system 200 is used, for example, in a mobile body such as a vehicle. In other words, the display system 200 may be an apparatus mounted in a vehicle or an apparatus brought into a vehicle. While, in the second embodiment, the display system 200 is described as being applied to a vehicle, the movable body is not limited to the vehicle, and it may be a ship or an airplane, for example. Furthermore, while the second embodiment is described in connection with an example in which a user is a passenger of the vehicle, particularly a driver of the vehicle, the present disclosure is not limited to that case. Moreover, the display system 200 may be used in a wearable computer (e.g., a later-described HMD) that can be used in a state put on a user's body.

In FIG. 5, the display system 200 includes a recognition unit 101, a vehicle information acquisition unit 502, a display control device 503, a display source 104, a map information acquisition unit 507, and a positioning information acquisition unit 508.

The vehicle information acquisition unit 502 obtains speed information and steering information of the relevant vehicle.

The display control device 503 controls image data projected from the display source 104 in accordance with the information of the object recognized by the recognition unit 101 and the speed information of the relevant vehicle, which is obtained by the vehicle information acquisition unit 502.

The display control device 503 includes a determination unit 505 and a control unit 506.

The determination unit 505 determines whether a current time is before a specific time at which a distance from the relevant vehicle to the object, recognized by the recognition unit 101, is shorter than a stopping distance calculated from the speed of the relevant vehicle, the speed being obtained by the vehicle information acquisition unit 502.

More specifically, the determination unit 505 calculates, on a 2-axis coordinate system with a traveling direction of the relevant vehicle being x and a direction perpendicular to the traveling direction being y, a distance between coordinates at which a segment representing the vehicle locus crosses a line extending from coordinates of the object perpendicularly to the segment and coordinates (0, 0) of the recognition unit 101, which represent the coordinate position of the relevant vehicle, as a distance from the relevant vehicle to the object when the object may intersect the vehicle locus. Furthermore, given that the speed of the relevant vehicle obtained by the vehicle information acquisition unit 502 is V, the determination unit 505 calculates a braking distance from a formula of V×V/(N×μ) and calculates a free running distance from a formula of V×1000/3600×RT, thus obtaining the sum of the braking distance and the free running distance as the stopping distance.

Here, N is a constant and is desirably given as 254. Furthermore, μ is a friction coefficient and is given as a value within a range specified depending on road conditions, as listed in FIG. 6. The friction coefficients listed in FIG. 6 are on the basis of data in Ando and Kuramochi, "Skid Friction of Road Surface, Road-Surface Management Standards, and Skid Accidents", Civil Engineering Journal 52-5, 2010. RT denotes a reaction speed. According to "Companion to Road Traffic Technology" edited by Japan Society of Traffic Engineers, when a vehicle is to be stopped from a traveling state through transmission of information recognized by a driver in the traveling state to the driver's brain, and through a braking operation that is actuated in accordance with a command from the brain, a "braking reaction time" that is a total of a reflection time (i.e., a time from perception to start of an action), a step changing time, and a depressing time is about 0.6 sec. However, the braking reaction time taken for the reaction operation is assumed to be 1.0 sec in practical calculation of the free running distance for the case where the vehicle is stopped with braking.

For example, when the speed of the relevant vehicle is 40 km/hour and the friction coefficient is 0.7, the braking distance is 40×40/(254×0.7)≈9.0 m, and the free running distance is 40×1000/3600×1.0≈11.1 m. Accordingly, the stopping distance is 9.0+11.1=20.1 m. The specific time is defined as a time taken for a movable body (object), which is estimated to jump into the vehicle locus, to move through a distance Dy from the object to the vehicle locus at a speed Vo. Assuming, for example, that Dy is 3 m and Vo is 10 km/hour, the specific time is 3/(10×1000/3600)≈1 sec. When the speed of the relevant vehicle is 40 km/hour, the vehicle travels through 11.1 m per second. Therefore, when the distance from the relevant vehicle to the object is shorter than 20.1 m+11.1 m=31.2 m, the determination unit 505 provides a determination result of YES.

The vehicle locus is given as a segment extending linearly when a steering angle is 0 degree from the steering information obtained by the vehicle information acquisition unit 502. When the steering angle is not 0 degree, the vehicle locus is given as a segment extending along a curve obtained from a clothoid curve, or a curve extending at the curvature of a curve of a road where the relevant vehicle is traveling, the curvature being specified from map information obtained by the map information acquisition unit 507 and a current position obtained by the positioning information acquisition unit 508.

If the determination unit 505 determines that the current time is before the specific time at which the distance from the relevant vehicle to the object is shorter than the stopping distance of the relevant vehicle, the control unit 506 determines a first display region in a direction (hereinafter referred to as a "locus approaching direction") toward the vehicle locus from a position where the object is present (e.g., a corner of a wall aside an intersection with poor visibility). The first display region is a region that is defined on the display, and that is located closer to the object and farther away from the vehicle locus than later-described second and third display region in the locus approaching direction. Stated in another way, the first display region is a region located midway in the locus approaching direction toward a vehicle locus on the display, which corresponds to the estimated vehicle locus, from a position on the display, which corresponds to the position where the object is present. While the expression "display region" is used here, the expression "display position" may be used instead (this point is similarly applied to the later-described second and third display regions). It is optional whether the position where the object is present and the vehicle locus are displayed or not on the display.

Figure 7:
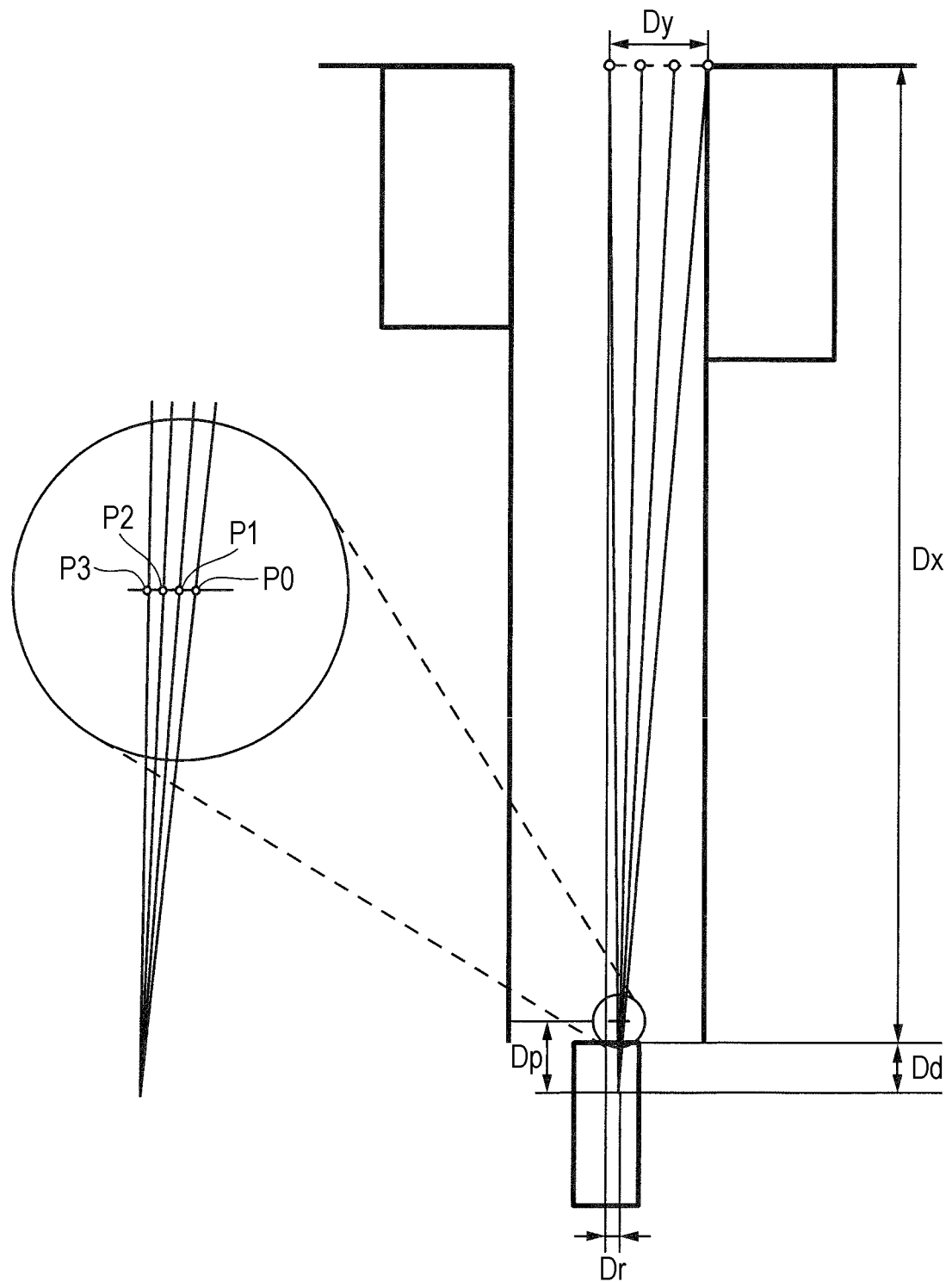
FIG. 7 is an explanatory view to explain a method of determining respective positions of first to third display regions in the second embodiment of the present disclosure.

As illustrated in FIG. 7, respective distances from a position P0 representing the object to a first display region P1, z second display region P2, and a third display region P3 are determined from a distance Dy from the object to the vehicle locus, a distance Dx from the relevant vehicle to the object, a distance Dd from the relevant vehicle to a viewing point of the driver, and a distance Dp from a display surface onto which an image is projected to the viewing point of the driver. More specifically, a distance d1 from P0 to P1 is determined from a formula of Dy/3×Dp/(Dx+Dd). A distance d2 from P0 to P2 is determined from a formula of 2×d1, and a distance d3 from P0 to P3 is determined from a formula of 3×d1. In the case of Dy=3 m, Dx=31 m, Dd=2 m, and Dp=3 m, for example, d1 is 3/3×3/(31+2)≈9 cm, d2 is 18 cm, and d3 is 27 cm. When the distance from the object to the first display region is shorter than a specific distance (e.g., 1 m), fourth and subsequent display regions may be added.

The control unit 506 controls the display source 104 at first timing to generate a first virtual image in the first display region and to project the first virtual image onto the display. This control is referred to as "first control" hereinafter.

The control unit 506 determines after the first control whether the number of times at which the virtual image has been generated (hereinafter referred to as the "number of times of image generation") reaches a specific number. The number of times of image generation can also be said as being the number of times at which the control unit 506 has controlled the display source 104 to generate and project the virtual image.

If the control unit 506 determines after the first control that the number of times of image generation does not yet reach the specific number, the control unit 506 updates the first display region and determines the second display region in the locus approaching direction. The second display region is a region that is defined on the display, and that is located farther away from the object than the updated first display region and farther away from the vehicle locus than the later-described third display region in the locus approaching direction. Stated in another way, the second display region is a region that is located midway in the locus approaching direction at a position closer to the vehicle locus on the display than the first display region.

At second timing later than the first timing, the control unit 506 controls the display source 104 to generate a first enlarged virtual image in the updated first display region, to generate a second virtual image in the second display region, and to project those virtual images onto the display. This control is referred to as "second control" hereinafter. The first enlarged virtual image is an image obtained by enlarging the first virtual image (namely, the first virtual image after being updated). The second virtual image is an image obtained by enlarging the first enlarged virtual image at a magnification of one or more.

The control unit 506 determines after the second control whether the number of times of image generation reaches the specific number. Then, until the number of times of image generation reaches the specific number, the control unit 506 repeats the above-described processing to update and determine the display regions and the above-described processing to control the display source 104.

The map information acquisition unit 507 obtains the curvature of a curve of a road where the relevant vehicle is traveling, the curve being specified from the designated position information.

The positioning information acquisition unit 508 obtains current position information of the relevant vehicle.

Figure 8:
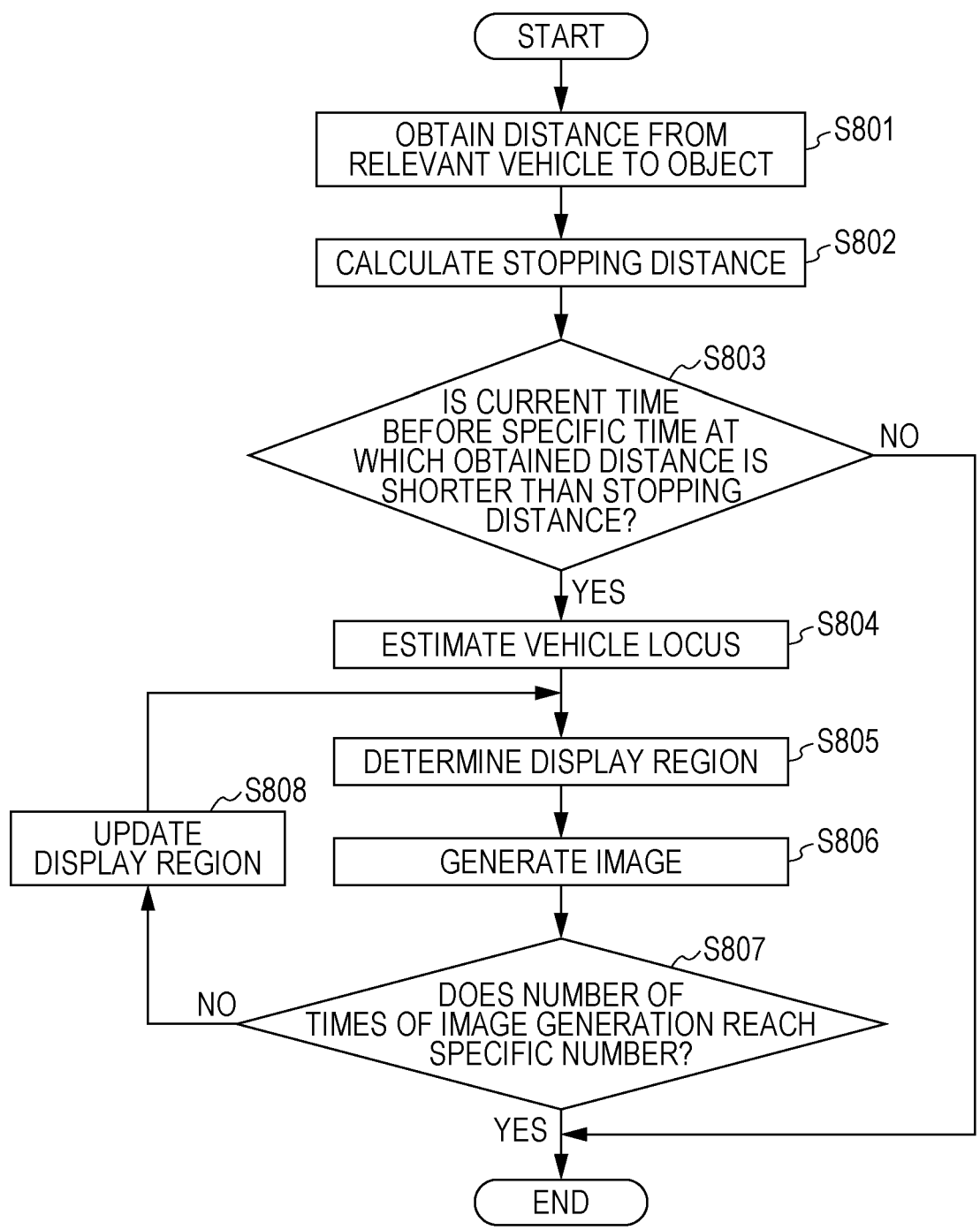
FIG. 8 is a flowchart illustrating an operation example of the display system according to the second embodiment of the present disclosure.

A processing flow in the display system 200 will be described below with reference to FIGS. 8, 9A, 9B and 9C. FIG. 8 is a flowchart illustrating an operation example of the display system 200.

Figure 9A:
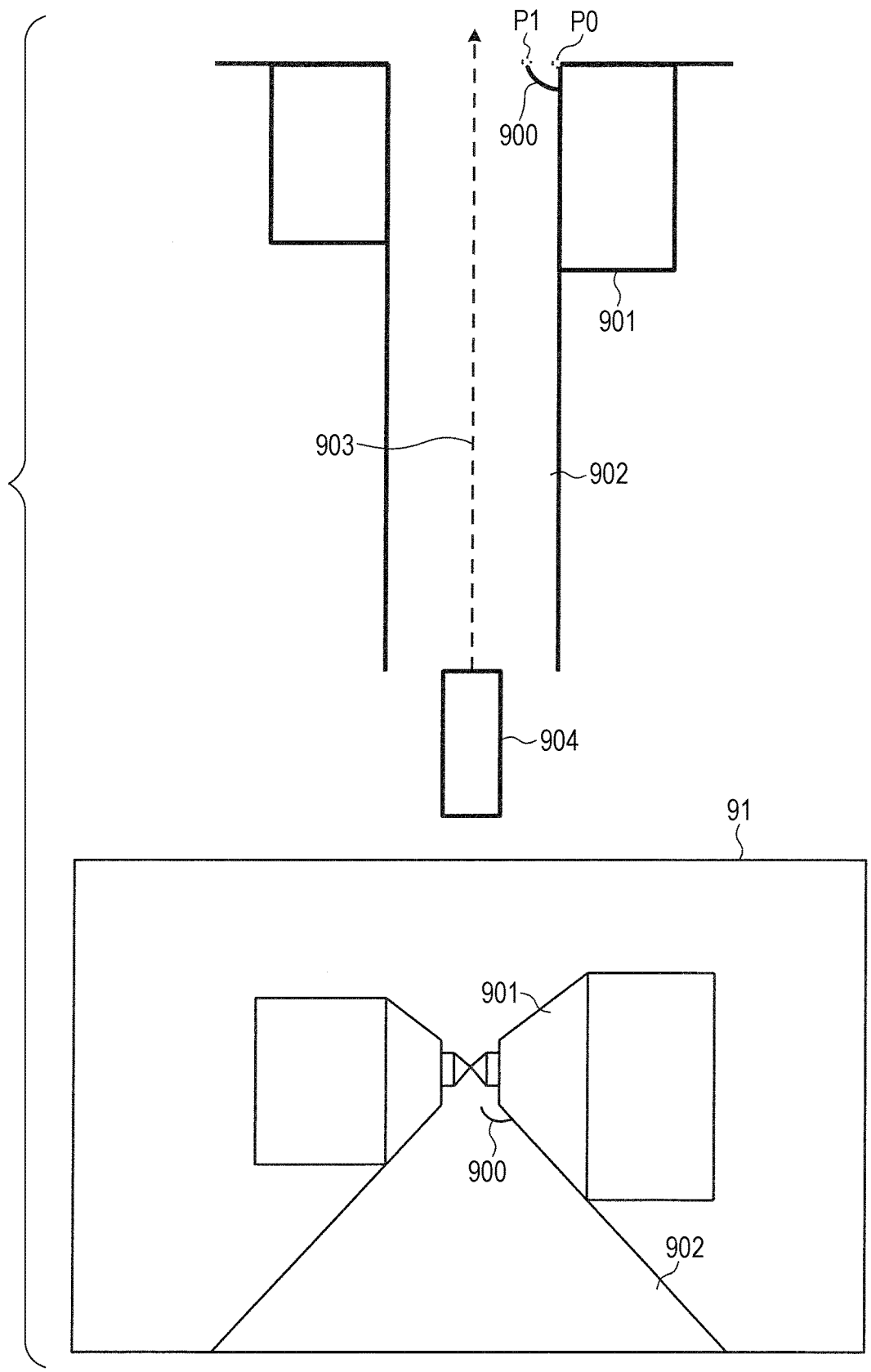
FIG. 9A illustrates a positional relationship between a relevant vehicle and an object, a superimposed position of a virtual image on an actual sight, and an example of superimposition of the virtual image on the visual field of the driver in the second embodiment of the present disclosure.

An upper side of FIG. 9A provides an overhead view representing a positional relationship between a relevant vehicle 904 and an object at a time t (P0 indicating a position of the object), and a position at which a first virtual image 900 having the form of a part of a water ring to be generated in the first display region is superimposed on an actual sight.

A lower side of FIG. 9A illustrates an example in which the first virtual image 900, having the form of a part of a water ring, to be generated in the display region of the display is superimposed on a visual field 91 of the driver.

Figure 9B:
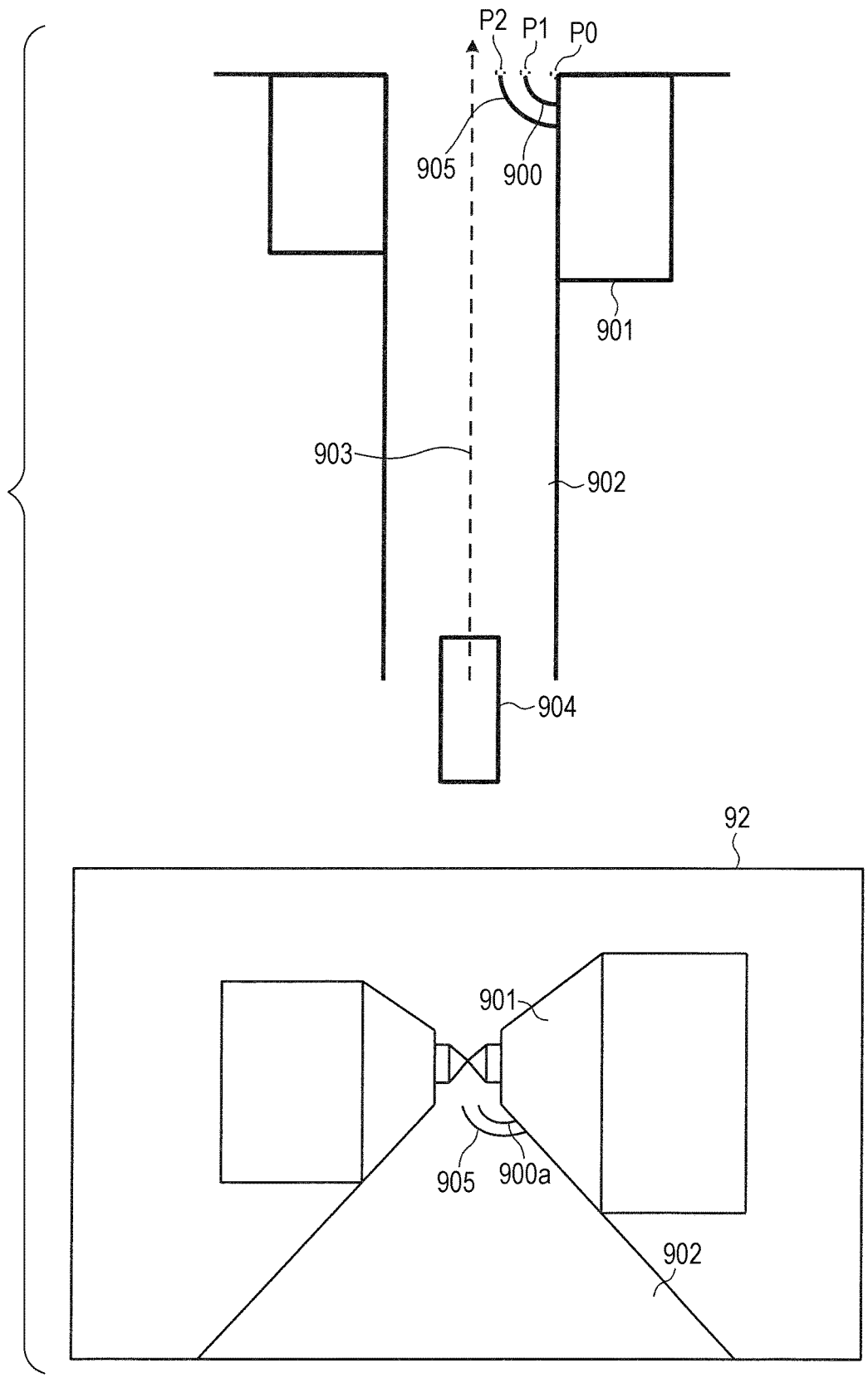
FIG. 9B illustrates a positional relationship between the relevant vehicle and the object, a superimposed position of a virtual image on the actual sight, and an example of superimposition of the virtual image on the visual field of the driver in the second embodiment of the present disclosure.

An upper side of FIG. 9B provides an overhead view representing a positional relationship between the relevant vehicle 904 and the object at a time t' (t<t'), and positions at which the first and second virtual images 900 and 905, each having the form of a part of a water ring, to be generated respectively in the first and second display regions are superimposed on the actual sight.

A lower side of FIG. 9B illustrates an example in which a first enlarged virtual image 900a and the second virtual image 905, each having the form of a part of a water ring, to be generated in the respective display regions of the display are superimposed on a visual field 92 of the driver.

Here, the first enlarged virtual image 900a is an image displayed in a size enlarging the first virtual image 900 corresponding to the fact that the relevant vehicle 904 has come closer to the object.

Figure 9C:
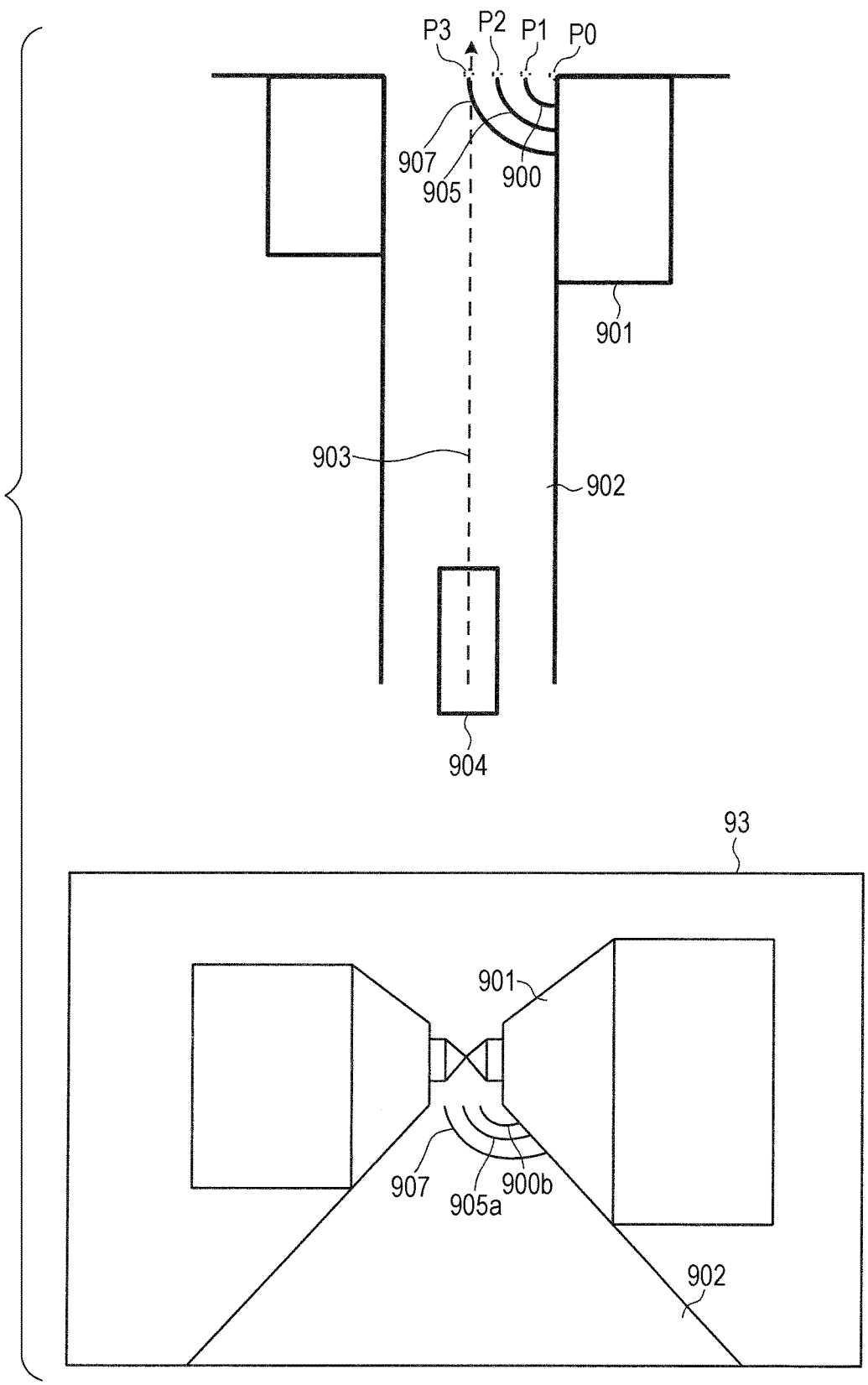
FIG. 9C illustrates a positional relationship between the relevant vehicle and the object, a superimposed position of a virtual image on the actual sight, and an example of superimposition of the virtual image on the visual field of the driver in the second embodiment of the present disclosure.

An upper side of FIG. 9C provides an overhead view representing a positional relationship between the relevant vehicle 904 and the object at a time t'' (t'<t''), and positions at which the first to third virtual images 900, 905 and 907, each having the form of a part of a water ring, to be generated respectively in the first to third display regions are superimposed on the actual sight.

A lower side of FIG. 9C illustrates an example in which a first enlarged virtual image 900b, a second enlarged virtual image 905a, and the third virtual image 907, each having the form of a part of a water ring, to be generated in the respective display regions of the display are superimposed on a visual field 93 of the driver.

Here, the first enlarged virtual image 900b and the second enlarged virtual image 905a are images displayed in sizes enlarging the first enlarged virtual image 900a and the second virtual image 905, respectively, corresponding to the fact that the relevant vehicle 904 has come closer to the object.

In step S801, the recognition unit 101 obtains a foreground image representing the visual field 91, recognizes a building 901 that is contained in the foreground image, and obtains a distance from the relevant vehicle to a poor-visibility corner of the building 901. The building 901 is an example of the object obstructing the visual field of the driver.

In step S802, the determination unit 505 obtains the traveling speed information of the relevant vehicle from the vehicle information acquisition unit 502, obtains the current position coordinate information of the relevant vehicle from the positioning information acquisition unit 508, and further obtains, as map information in the traveling direction, the road condition information in consideration of weather as well from the map information acquisition unit 507 based on the current position coordinate information of the relevant vehicle. Then, the determination unit 505 derives the friction coefficient corresponding to the road condition and calculates the stopping distance in accordance with the specific braking reaction time.

In step S803, the determination unit 505 determines whether the current time is before the specific time at which the obtained distance from the relevant vehicle to the corner is shorter than the stopping distance.

If the determination unit 505 determines that the current time is not before the specific time at which the obtained distance is shorter than the stopping distance (step S803: NO), the flow is ended. Assume here, for example, that the determination unit 505 determines that the current time is before the specific time at which the obtained distance is shorter than the stopping distance (step S803: YES).

In step S804, the estimation unit 102 estimates a vehicle locus 903 on a road 902 where the vehicle is traveling. The vehicle locus 903 represents the traveling direction of the vehicle. While the overhead view of FIG. 9A illustrates the vehicle locus 903 for the sake of explanation, it is optional whether an image of the vehicle locus 903 is displayed or not on the display.

In step S805, the control unit 506 determines the first display region (not illustrated) midway in the locus approaching direction toward the vehicle locus 903 from the corner of the building 901. Here, the corner of the building 901 is a corner, which is positioned on the side nearer to the vehicle locus 903, and to which the vehicle traveling along the vehicle locus 903 comes close later in time. The first display region is located closest to the building 901 and farthest away from the vehicle locus 903 in the locus approaching direction in comparison with the second and third display regions.

In step S806, the control unit 506 controls the display source 104 at first timing to generate the first virtual image 900, which is in the form of a part of a water ring (or an arched shape), in the first display region, and to project the first virtual image 900 onto the display (this corresponds to the first control). The first timing is the same as or later than the time t, and it is before the time t'.

With the first control, at the first timing, the display source 104 generates the first virtual image 900 in the first display region and projects the first virtual image 900 onto the display. As a result, the first virtual image 900 is displayed in a state superimposed on the visual field 91, as illustrated in FIG. 9A. A size of the first virtual image 900 indicates a range within which the object may move toward the vehicle locus 903. As a preferable example, the range is illustrated here in the form of a part of a water ring spreading in a direction toward the relevant vehicle 904 (this point is similarly applied to the other virtual images described later).

In step S807, the control unit 506 determines whether the number of times at which the virtual image has been generated reaches a specific number (e.g., three). Here, because the processing is in a stage after the first control, the number of times of image generation is one. Accordingly, the control unit 506 determines that the number of times of image generation does not yet reach three (step S807: NO). Then, the flow proceeds to step S808. The specific number is not limited to three.

The processing flow is further described with reference to FIG. 9B. FIG. 9B illustrates an example of the visual field 92 of the driver at the time t' (t'>t). The visual field 92 corresponds to a state where the vehicle has advanced in the traveling direction from the state corresponding to the visual field 91 with the lapse of time and with the traveling of the vehicle.

In step S808, the control unit 506 updates the first display region in the locus approaching direction toward the vehicle locus 903 from the building 901 in accordance with the change (enlargement) from the visual field 91 to the visual field 92. Then, the flow returns to step S805.

In step S805, the control unit 506 determines the second display region (not illustrated) midway in the locus approaching direction toward the vehicle locus 903 from the building 901. The second display region is a region located farther away from the building 901 than the updated first display region and farther away from the vehicle locus 903 than the third display region in the locus approaching direction.

In step S806, the control unit 506 controls the display source 104 at second timing to generate the first enlarged virtual image 900a in the updated first display region, to generate the second virtual image 905 in the second display region, and to project those virtual images onto the display (this corresponds to the second control). The first enlarged virtual image 900a is an image obtained by enlarging the first virtual image 900. The second virtual image 905 is an image obtained by enlarging the first enlarged virtual image 900a at a magnification of one or more. The second timing is the same as or later than the time t', and it is before the time t".

With the second control, at the second timing, the display source 104 generates the first enlarged virtual image 900a in the updated first display region, generates the second virtual image 905 in the second display region, and projects those virtual images onto the display. As a result, the first enlarged virtual image 900a and the second virtual image 905 are displayed in a state superimposed on the visual field 92, as illustrated in FIG. 9B.

The first enlarged virtual image 900a at the time t' may be displayed by employing the first virtual image 900 displayed at the time t as it is.

In step S807, the control unit 506 determines whether the number of times at which the virtual image has been generated reaches three. Here, because the processing is in a stage after the second control, the number of times of image generation is two. Accordingly, the control unit 506 determines that the number of times of image generation does not yet reach three (step S807: NO). Then, the flow proceeds to step S808.

The processing flow is further described with reference to FIG. 9C. FIG. 9C illustrates an example of the visual field 93 of the driver at the time t" (t">t'). The visual field 93 corresponds to a state where the vehicle has advanced in the traveling direction from the state corresponding to the visual field 92 with the lapse of time and with the traveling of the vehicle.

In step S808, the control unit 506 updates the updated first display region and the second display region in the locus approaching direction toward the vehicle locus 903 from the building 901 in accordance with the change (enlargement) from the visual field 92 to the visual field 93. Then, the flow returns to step S805.

In step S805, the control unit 506 determines the third display region (not illustrated) midway in the locus approaching direction toward the vehicle locus 903 from the building 901. The third display region is located farther away from the building 901 and closer to the vehicle locus 903 than the updated second display region in the locus approaching direction.

In step S806, the control unit 506 controls the display source 104 at third timing to generate a first enlarged virtual image 900b in the re-updated first display region, to generate a second enlarged virtual image 905a in the updated second display region, to generate the third virtual image 907 in the third display region (not illustrated), and to project those virtual images onto the display (this corresponds to the third control). The first enlarged virtual image 900b and the second enlarged virtual image 905a are images obtained by enlarging the first enlarged virtual image 900a and the second virtual image 905, respectively. The second enlarged virtual image 905a is an image obtained by enlarging the first enlarged virtual image 900b at a magnification of one or more. The third virtual image 907 is an image obtained by enlarging the second enlarged virtual image 905a at a magnification of one or more. The third timing is the same as or later than the time t".

With the third control, at the third timing, the display source 104 generates the first enlarged virtual image 900b in the re-updated first display region, generates the second enlarged virtual image 905a in the updated second display region, generates the third virtual image 907 in the third display region, and projects those virtual images onto the display. As a result, the first enlarged virtual image 900b, the second enlarged virtual image 905a, and the third virtual image 907 are displayed in a state superimposed on the visual field 93, as illustrated in FIG. 9C.

In step S807, the control unit 506 determines whether the number of times at which the virtual image has been generated reaches three. Here, because the processing is in a stage after the third control, the number of times of image generation is three. Accordingly, the control unit 506 determines that the number of times of image generation has reached three (step S807: YES). The flow is thereby ended.

As described above, the second embodiment is featured in displaying a plurality of virtual images at intervals of a specific time such that the virtual images come closer to the vehicle locus from the object obstructing the visual field. With that feature, the driver can confirm the region or the object in or for which there is a possibility of an accident, and the driver can recognize whether an action to avoid the accident is to be taken at once (i.e., the urgency).

Furthermore, the second embodiment is featured in displaying the plural virtual images at magnifications gradually increasing at positions closer to the vehicle locus while the size of each virtual image represents the range within which the object may move toward the vehicle. With that feature, the driver can confirm the range where an accident may occur with respect to an object, which is uncertain in motion, (i.e., the uncertainty) at intervals of a specific time.

(Eighth Modification)

An eighth modification will be described below with reference to FIGS. 10A, 10B and 10C.

Figure 10A:
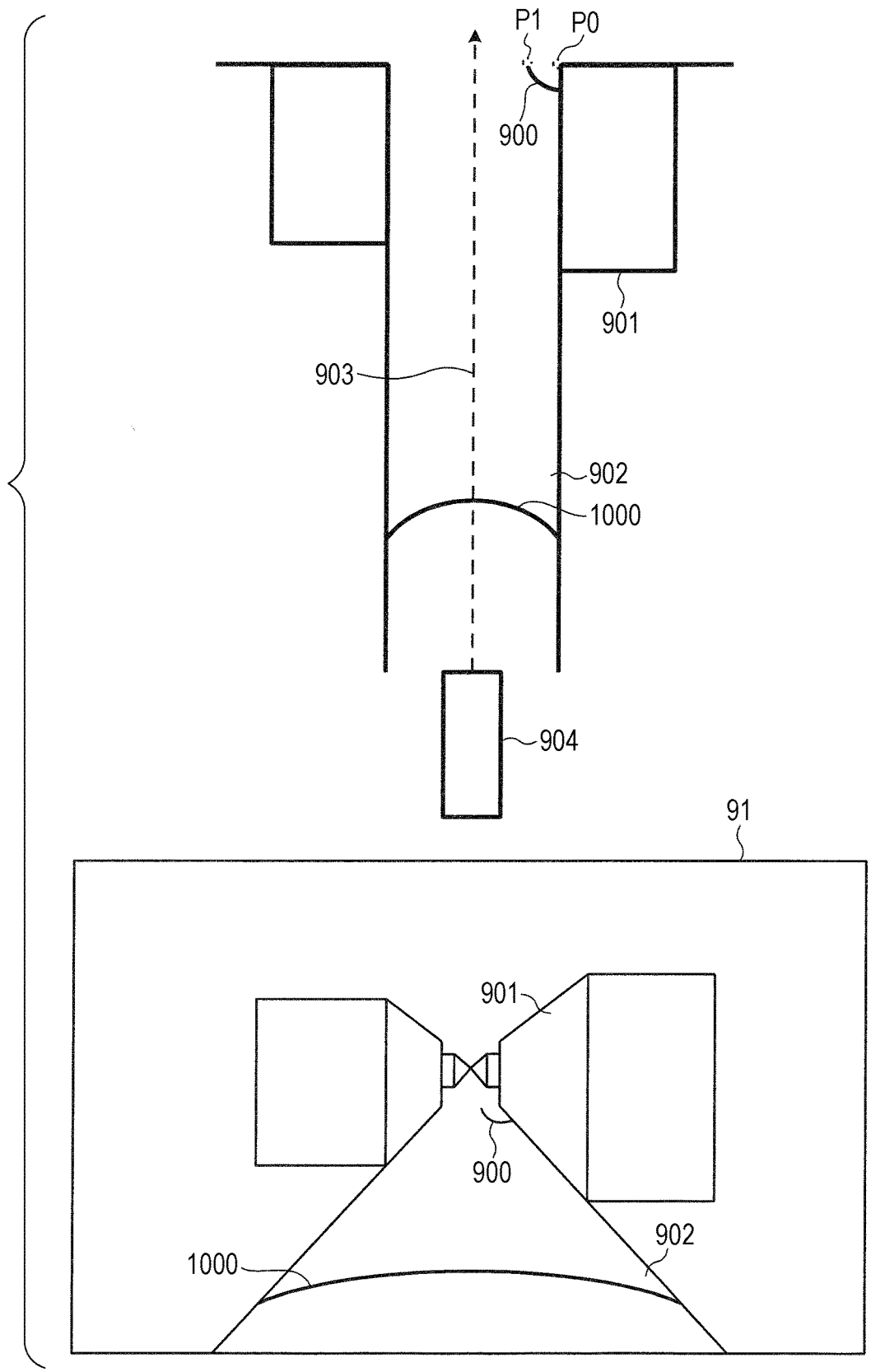
FIG. 10A illustrates a positional relationship between the relevant vehicle and the object, a superimposed position of a virtual image on the actual sight, and an example of superimposition of the virtual image on the visual field of the driver in the second embodiment of the present disclosure.

An upper side of FIG. 10A provides an overhead view representing a positional relationship between the relevant vehicle 904 and the object at the time t (P0 indicating the position of the object), and positions at which the first virtual image 900, having the form of a part of a water ring, to be generated in the first display region and a fourth virtual image 1000 indicating, corresponding to the first virtual image 900, a traveling position of the relevant vehicle at the time t in the form of a part of a water ring are superimposed on the actual sight.

A lower side of FIG. 10A illustrates an example in which the first virtual image 900, having the form of a part of a water ring, to be generated in the display region of the display and the fourth virtual image 1000 indicating, corresponding to the first virtual image 900, the traveling position of the relevant vehicle at the time t in the form of a part of a water ring are superimposed on the visual field 91 of the driver.

Figure 10B:
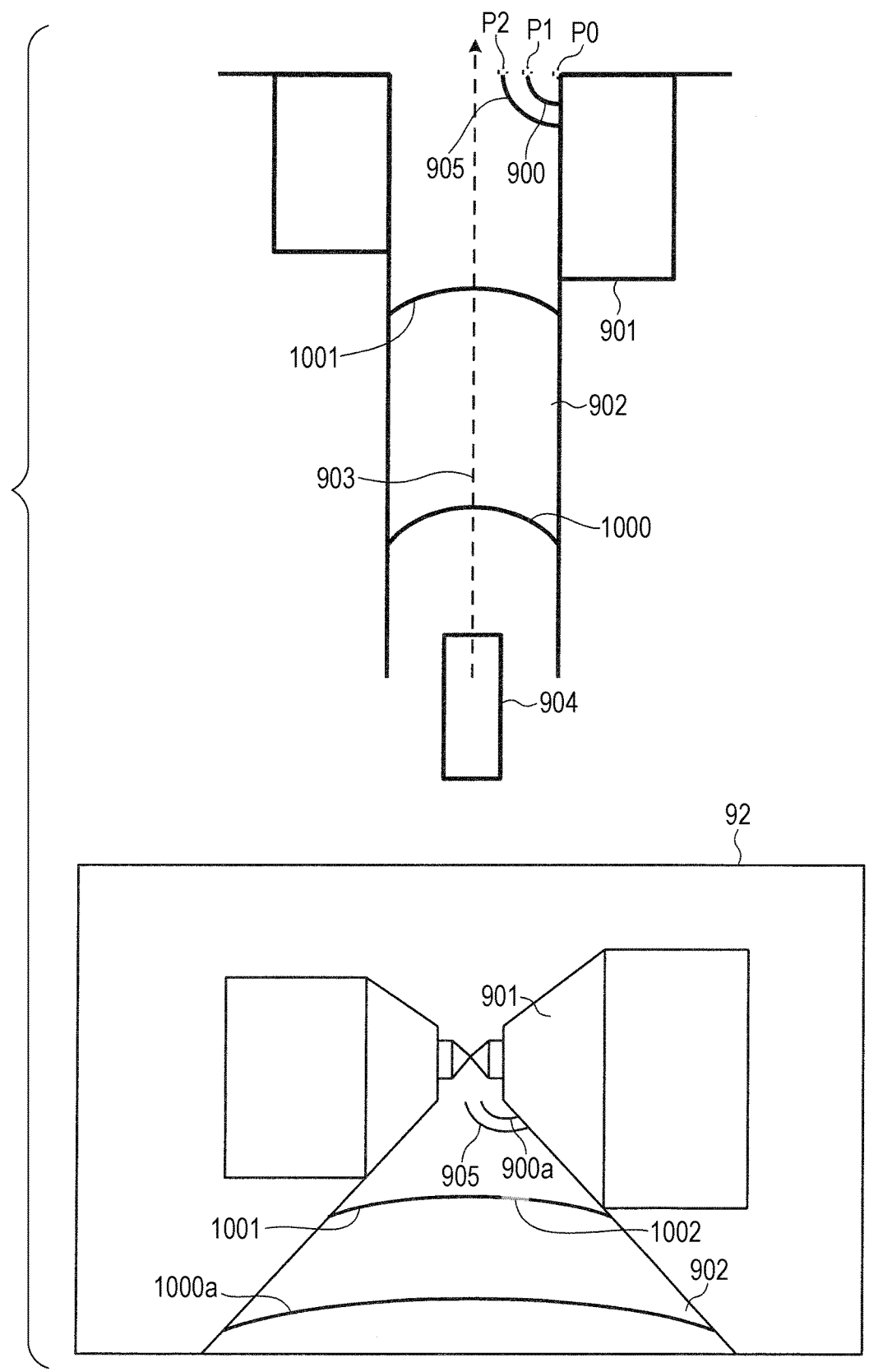
FIG. 10B illustrates a positional relationship between the relevant vehicle and the object, a superimposed position of a virtual image on the actual sight, and an example of superimposition of the virtual image on the visual field of the driver in the second embodiment of the present disclosure.

An upper side of FIG. 10B provides an overhead view representing a positional relationship between the relevant vehicle 904 and the object at the time t' (t<t'), and positions at which the first and second virtual images 900 and 905, each having the form of a part of a water ring, to be generated respectively in the first and second display regions and the fourth and fifth virtual images 1000 and 1001 indicating, corresponding respectively to the first and second virtual images 900 and 905, traveling positions of the relevant vehicle at the time t' in the forms of parts of water rings are superimposed on the actual sight.

A lower side of FIG. 10B illustrates an example in which the first enlarged virtual image 900a and the second virtual image 905, each having the form of a part of a water ring, to be generated in the respective display regions of the display, and a fourth enlarged virtual image 1000a and the fifth virtual image 1001 indicating, corresponding respectively to the first enlarged virtual image 900a and the second virtual image 905, the traveling positions of the relevant vehicle at the time t' in the form of parts of water rings are superimposed on the visual field 92 of the driver.

Here, the first enlarged virtual image 900a and the fourth enlarged virtual image 1000a are images displayed in sizes enlarging the first virtual image 900 and the fourth virtual image 1000, respectively, corresponding to the fact that the relevant vehicle 904 has come closer to the object.

Figure 10C:
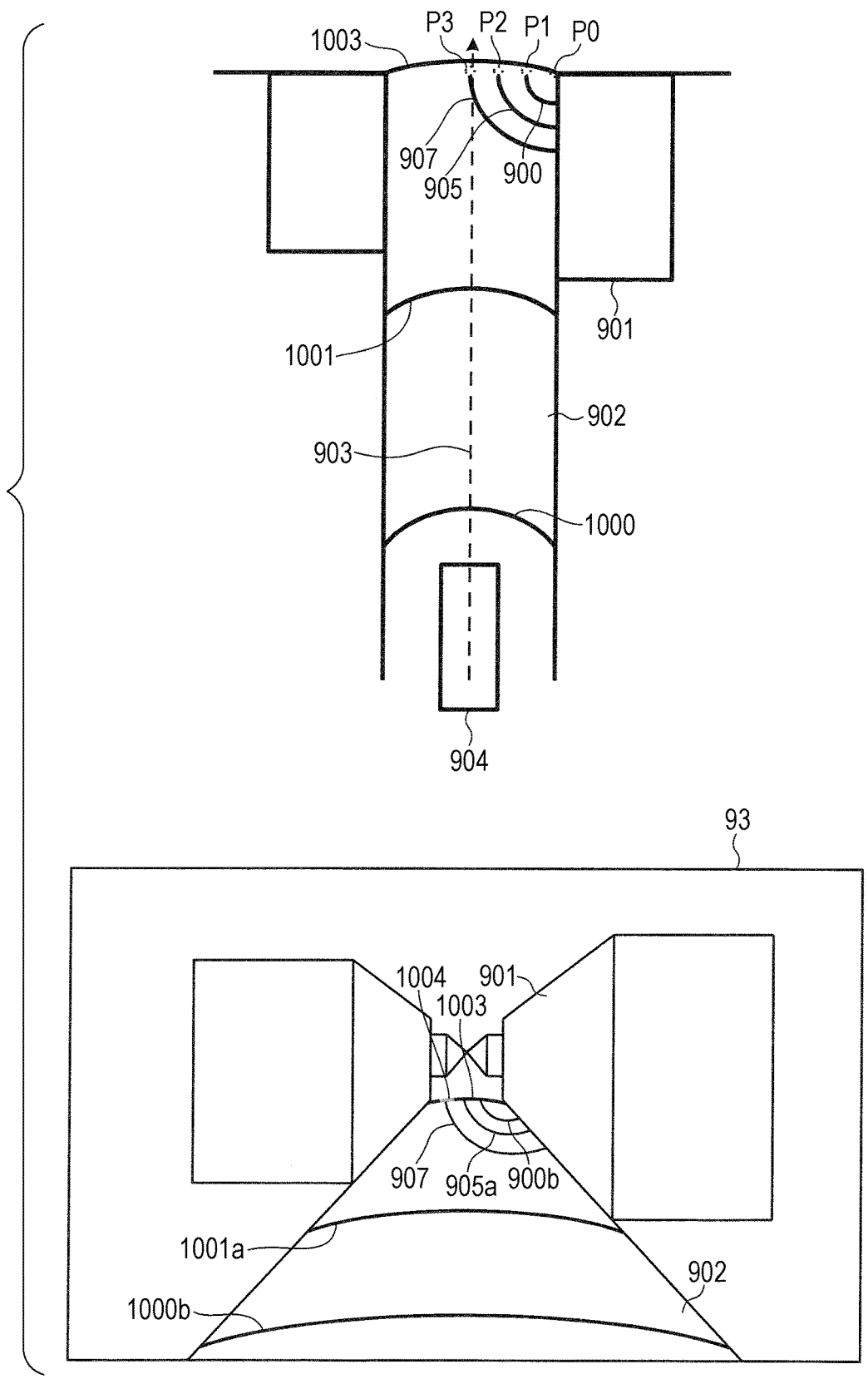
FIG. 10C illustrates a positional relationship between the relevant vehicle and the object, a superimposed position of a virtual image on the actual sight, and an example of superimposition of the virtual image on the visual field of the driver in the second embodiment of the present disclosure.

An upper side of FIG. 10C provides an overhead view representing a positional relationship between the relevant vehicle 904 and the object at the time t" (t'<t"), and positions at which the first to third virtual images 900, 905 and 907, each having the form of a part of a water ring, to be generated respectively in the first to third display regions and the fourth to sixth virtual images 1000, 1001 and 1003 indicating, corresponding respectively to the first to third virtual images 900, 905 and 907, traveling positions of the relevant vehicle at the time t" in the forms of parts of water rings are superimposed on the actual sight.

A lower side of FIG. 10C illustrates an example in which the first enlarged virtual image 900b, the second enlarged virtual image 905a, and the third virtual image 907, each having the form of a part of a water ring, to be generated in the respective display regions of the display, and a fourth enlarged virtual image 1000b, a fifth enlarged virtual image 1001a, and the sixth virtual image 1003 indicating, corresponding respectively to the first to third virtual images 900b, 905a and 907, the traveling positions of the relevant vehicle at the time t" in the form of parts of water rings are superimposed on the visual field 93 of the driver.

Here, the first enlarged virtual image 900b, the second enlarged virtual image 905a, the fourth enlarged virtual image 1000b, and the fifth enlarged virtual image 1001a are images displayed in sizes enlarging the first enlarged virtual image 900a, the second virtual image 905, the fourth enlarged virtual image 1000a, and the fifth virtual image 1001, respectively, corresponding to the fact that the relevant vehicle 904 has come closer to the object.

As illustrated in FIG. 10A, at the first timing, the control unit 506 controls the display source 104 to generate the first virtual image 900 having the form of a part of a water ring (or the arched shape) in the first display region, to generate the fourth virtual image 1000 having the form of a part of a water ring in the fourth display region, and to project those virtual images onto the display.

Then, as illustrated in FIG. 10B, at the second timing, the control unit 506 controls the display source 104 to generate the first enlarged virtual image 900a in the updated first display region, to generate the second virtual image 905 in the second display region, to generate the fourth enlarged virtual image 1000a in the updated fourth display region, to generate the fifth virtual image 1001 in the fifth display region, and to project those virtual images onto the display (this corresponds to the second control). The first enlarged virtual image 900a is an image obtained by enlarging the first virtual image 900. The second virtual image 905 is an image obtained by enlarging the first enlarged virtual image 900a at a magnification of one or more. The fourth enlarged virtual image 1000a is an image obtained by enlarging the fourth virtual image 1000. Here, as illustrated in FIG. 10B, luminance of a part 1002 of the fifth virtual image 1001, the part 1002 being positioned closest to the second virtual image 905, may be increased. As an alternative, the hue of the fifth virtual image 1001 may be changed in order of red, yellow, and green from a position closest to the second virtual image 905.

Then, as illustrated in FIG. 10C, at the third timing, the control unit 506 controls the display source 104 as follows (this corresponds to the third control). The display source 104 generates the first enlarged virtual image 900b in the re-updated first display region, the second enlarged virtual image 905a in the updated second display region, and the third virtual image 907 in the third display region. Furthermore, the display source 104 generates the fourth enlarged virtual image 1000b in the re-updated fourth display region, the fifth enlarged virtual image 1001a in the updated fifth display region, and the sixth virtual image 1003 in the sixth display region. In addition, the display source 104 projects those virtual images onto the display. The first enlarged virtual image 900b and the second enlarged virtual image 905a are images obtained by enlarging the first enlarged virtual image 900a and the second virtual image 905, respectively. The second enlarged virtual image 905a is an image obtained by enlarging the first enlarged virtual image 900b at a magnification of one or more. The fourth enlarged virtual image 1000b is an image obtained by enlarging the fourth enlarged virtual image 1000a. The fifth enlarged virtual image 1001a is an image obtained by enlarging the fifth virtual image 1001. Here, as illustrated in FIG. 10C, luminance of a part 1004 of the sixth virtual image 1003, the part 1004 being positioned closest to the third virtual image 907, may be increased. As an alternative, the hue of the sixth virtual image 1003 may be changed in order of red, yellow, and green from a position closest to the third virtual image 907.

Figure 11:
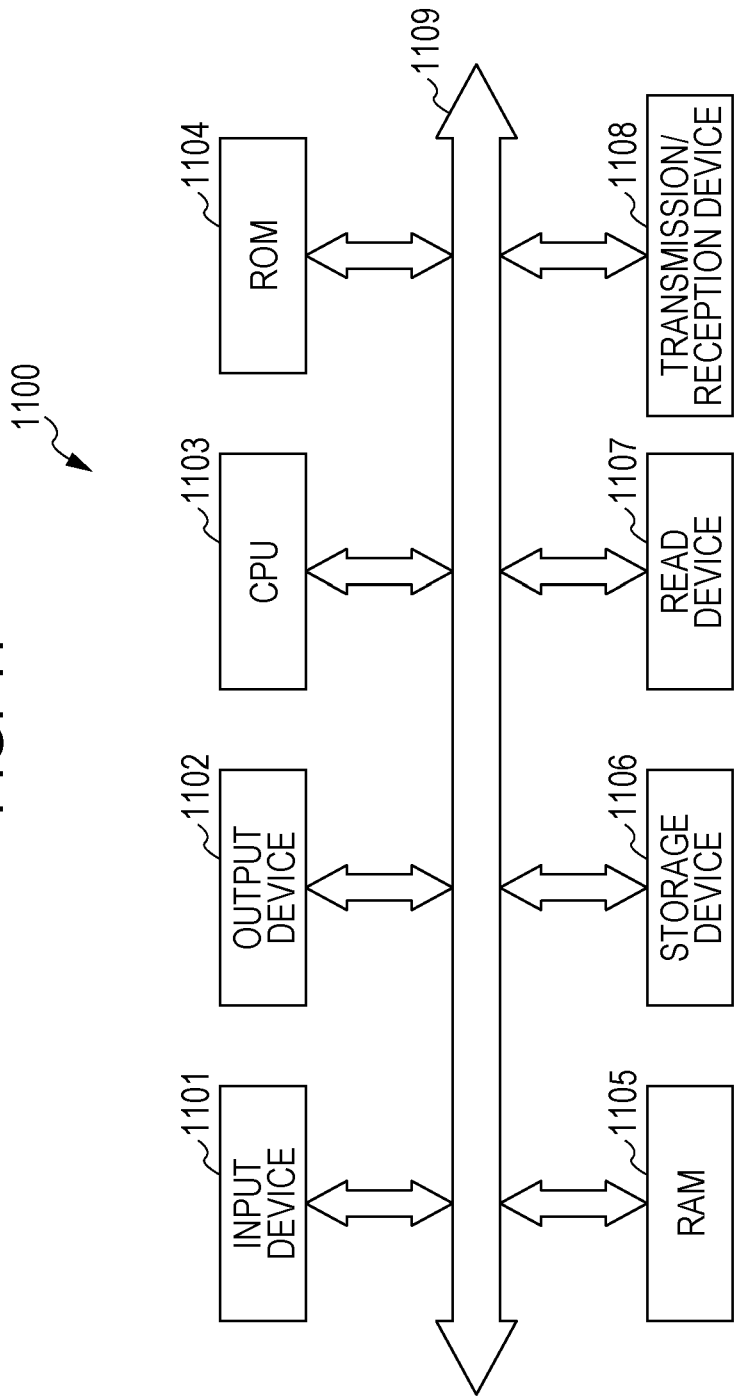
FIG. 11 is a block diagram illustrating a hardware configuration example of the display systems and the display control devices according to the first and second embodiments of the present disclosure and modifications thereof.

FIG. 11 is a block diagram illustrating a hardware configuration example of a computer 1100 that implements the functions of the above-described components with the aid of programs. The computer 1100 includes an input device 1101 such as an input button or a touch pad, an output device 1102 such as a display or a speaker, a CPU (Central Processing Unit) 1103, a ROM (Read Only Memory) 1104, a RAM (Random Access Memory) 1105, a storage device 1106 such as a hard disk or an SSD (Solid State Drive), a read device 1107 for reading information from a storage medium such as a DVD-ROM (Digital Versatile Disk Read Only Memory) or a USB (Universal Serial Bus) memory, and a transmission/reception device 1108 for communication via a network. Those components are interconnected by a bus 1109.

From a non-transitory computer-readable storage medium that stores programs to implement the functions of the above-described components, the read device 1107 reads the programs and stores them in the storage device 1106. Alternatively, the transmission/reception device 1108 communicates with a server that is connected to the network, downloads the programs to implement the functions of the above-described components from the server, and stores the downloaded programs in the storage device 1106.

The CPU 1103 copies the programs stored in the storage device 1106 into the RAM 1105, reads commands contained in the programs from the RAM 1105 in sequence, and executes the commands, thereby implementing the functions of the above-described components. Moreover, when the programs are executed, the information obtained with the above-described various types of processing is stored in the RAM 1105 or the storage device 1106, and is utilized as appropriate.

The present disclosure can be applied to a display control device, a display control method, and a non-transitory computer-readable storage medium, which are used to control display of information for calling driver's attention.

What is claimed is:

1. A display control device in a display system, the display system obtaining a foreground image of a movable body, recognizing one or more objects contained in the foreground image, estimating a locus along which the movable body travels, and generating a specific image for display on a display medium, the display control device comprising:
   a memory that stores instructions;
   a processor that, when executing the instructions stored in the memory, performs operations comprising:
      determining whether a first object recognized in the foreground image is present in a specific region adjacent to the estimated locus; and
      controlling the display system, when the processor determines that the first object is present in the specific region, to generate a first virtual image and to display the first virtual image in a first region on the display medium at a first timing, and to generate a first enlarged virtual image and a second virtual image and to display the first enlarged virtual image in an updated first region and the second virtual image in a second region on the display medium at a second timing later than the first timing,
   wherein the first region is determined on the display medium in a location between the estimated locus and a current position of the first object,
   the second region is determined on the display medium in a location between the estimated locus and the current position of the first object, and that is located closer to the estimated locus than the first region and not overlapping with the first region, and
   the second virtual image is displayed in a size equal to or larger than a size of the first enlarged virtual image displayed in the updated first region at the second timing.

2. The display control device according to claim 1, wherein the processor further controls the display system to shorten a distance between the first virtual image displayed in the first region and the second virtual image as a distance between the first object and the movable body becomes shorter.

3. The display control device according to claim 1, wherein the processor further controls the display system to shorten a distance between the first virtual image displayed in the first region and the second virtual image as a speed of the movable body becomes higher or as change in the speed of the movable body increases.

4. The display control device according to claim 1, wherein the processor further controls the display system to shorten a time from the display of the first virtual image, which is displayed in the first region at the first timing, to the display of the second virtual image in the second region at the second timing as a distance between the first object and the movable body becomes shorter.

5. The display control device according to claim 1, wherein the processor further controls the display system to shorten a time from the display of the first virtual image, which is displayed in the first region at the first timing, to the display of the second virtual image in the second region at the second timing as a speed of the movable body becomes higher or as change in the speed of the movable body increases.

6. The display control device according to claim 1, wherein, when the processor further determines that a second object and the first object are present in the specific region, the processor further controls the display system to generate first virtual images displayed in the first region and second virtual images in the second region in sizes different per object depending on a distance between the movable body and each of the first object and the second object.

7. A display control method for a display system, the display system obtaining a foreground image of a movable body, recognizing an object contained in the foreground image, estimating a locus along which the movable body travels, and generating a specific image for display on a display medium, the display control method comprising:
  determining, by a processor, whether the object recognized in the foreground image is present in a specific region adjacent to the estimated locus; and
  controlling the display system, when the processor determines that the object is present in the specific region, to generate a first virtual image and to display the first virtual image in a first region on the display medium at a first timing, and to generate a first enlarged virtual image and a second virtual image and to display the first enlarged virtual image in an updated first region and the second virtual image in a second region on the display medium at a second timing later than the first timing,
  wherein the first region is determined on the display medium in a location between the estimated locus and a current position of the object,
  the second region is determined on the display medium in a location between the estimated locus and the current position of the object, and that is located closer to the estimated locus than the first region and not overlapping with the first region, and
  the second virtual image is displayed in a size equal to or larger than a size of the first enlarged virtual image displayed in the updated first region at the second timing.

8. A non-transitory computer-readable storage medium including a program that causes a computer including a processor to execute display control for a display system, the display system obtaining a foreground image of a movable body, recognizing an object contained in the foreground image, estimating a locus along which the movable body travels, and generating a specific image for display on a display medium, the program instructing the processor to perform processing of:
  determining whether the object recognized in the foreground image is present in a specific region adjacent to the estimated locus; and
  controlling the display system, when the processor determines that the object is present in the specific region, to generate a first virtual image and to display the first virtual image in a first region on the display medium at a first timing, and to generate a first enlarged virtual image and a second virtual image and to display the first enlarged virtual image in an updated first region and the second virtual image in a second region on the display medium at a second timing later than the first timing,
  wherein the first region is determined on the display medium in a location between the estimated locus and a current position of the object,
  the second region is determined on the display medium in a location between the estimated locus and the current position of the object, and that is located closer to the estimated locus than the first region and not overlapping with the first region, and
  the second virtual image is displayed in an enlarged size equal to or larger than a size of the first enlarged virtual image displayed in the updated first region at the second timing.

9. The display control device according to claim 1, wherein the updated first region is determined with a distance between the updated first region and the estimated locus being shorter than a distance between the first region and the estimated locus, whereby the first enlarged virtual image and the second virtual image are displayed on the display medium in closer relation than the first virtual image and the second virtual image.

10. The display control device according to claim 1, wherein the display system includes a camera that obtains the foreground image of the movable body and recognizes the one or more objects contained in the foreground image, an estimation unit that estimates the locus along which the movable body travels, and a display source that generates the specific image for display on the display medium.

* * * * *